(12) United States Patent
Lui et al.

(10) Patent No.: US 7,861,178 B2
(45) Date of Patent: Dec. 28, 2010

(54) SYSTEM AND METHOD FOR DYNAMIC ASSISTANCE IN SOFTWARE APPLICATIONS USING BEHAVIOR AND HOST APPLICATION MODELS

(75) Inventors: Philip Lui, New York, NY (US);
Zbigniew Kopytnik, East Stroudsburg, PA (US)

(73) Assignee: KNOA Software, Inc., New York, NY (US)

( * ) Notice: Subject to any disclaimer, the term of this patent is extended or adjusted under 35 U.S.C. 154(b) by 1050 days.

(21) Appl. No.: 11/387,456

(22) Filed: Mar. 22, 2006

(65) Prior Publication Data

US 2007/0050719 A1    Mar. 1, 2007

Related U.S. Application Data

(63) Continuation of application No. 09/989,716, filed on Nov. 20, 2001, now Pat. No. 7,047,498, which is a continuation of application No. 09/306,869, filed on May 7, 1999, now Pat. No. 6,340,977.

(51) Int. Cl.
*G06F 3/00* (2006.01)

(52) U.S. Cl. ........................ 715/762; 715/764; 715/708; 715/709; 715/745

(58) Field of Classification Search ................. 715/762, 715/708, 744, 764, 709, 745
See application file for complete search history.

(56) References Cited

U.S. PATENT DOCUMENTS 4,622,013 A    11/1986    Cerchio (Continued)

FOREIGN PATENT DOCUMENTS

EP    0407269    7/1990

(Continued)

OTHER PUBLICATIONS

International Search Report Application No. PCT/US00/12106, dated Aug. 25, 2000, 2 pages.

*Primary Examiner*—Simon Ke
(74) *Attorney, Agent, or Firm*—Foley & Lardner LLP

(57) ABSTRACT

A Cooperative Help Assistance (CHA) system and method provide real-time user assistance for one or more windows-based Graphic User Interface (GUI) applications or a single application's different subsections such as web pages, running concurrently in any operating system. The CHA System enables the development of an informative assistance object independently from the original source code or development environment of the target Host Application. The assistance object can be selected by any number of user interfaces from sophisticated inference driven interactive interface search tools or categorized lists. By intercepting and monitoring user actions on a Host Application, the CHA system performs intelligent assistance in the context of the target host application program. Utilizing a Host Application Model, the CHA System and method dynamically assemble many elements in real-time or just-in-time to produce assistance sequences or elements very efficiently without having to code every interface path permutation. Paths can be dynamically generated from the Host Application Model, which enables a real-time module to offer intelligent, contextual assistance as well as real-time construction of automated, accelerated CHA Sequences or Procedures that require little or no user interaction. All assistance and information are processed and expressed by an extensive multitasking, multimedia subsystem for two dimensional (2D) and real-time three-dimensional (3D) application interfaces, which greatly enhances and extends the effectiveness of any explanation or material expression. The production of Assistant Sequences is facilitated by the Host Application Model and 2D and 3D GUI "drag and drop" interface tools.

10 Claims, 20 Drawing Sheets

U.S. PATENT DOCUMENTS

| | | | |
|---|---|---|---|
| 4,648,062 A | 3/1987 | Johnson et al. | |
| 5,103,498 A | 4/1992 | Lanier et al. | |
| 5,122,972 A | 6/1992 | Richards et al. | |
| 5,175,812 A | 12/1992 | Krieger | |
| 5,179,654 A | 1/1993 | Richards et al. | |
| 5,182,705 A | 1/1993 | Barr et al. | |
| 5,239,617 A | 8/1993 | Gardner et al. | |
| 5,257,381 A | 10/1993 | Cook | |
| 5,337,319 A | 8/1994 | Furukawa et al. | |
| 5,349,657 A | 9/1994 | Lee | |
| 5,377,319 A | 12/1994 | Kitahara et al. | |
| 5,388,251 A | 2/1995 | Makino et al. | |
| 5,432,940 A | 7/1995 | Potts et al. | |
| 5,434,963 A | 7/1995 | Kuwamoto et al. | |
| 5,442,759 A | 8/1995 | Chiang et al. | |
| 5,475,843 A * | 12/1995 | Halviatti et al. | 717/124 |
| 5,483,632 A | 1/1996 | Kuwamoto et al. | |
| 5,485,544 A | 1/1996 | Nonaka et al. | |
| 5,488,685 A | 1/1996 | Palmer et al. | 345/708 |
| 5,491,780 A | 2/1996 | Fyles et al. | |
| 5,493,658 A | 2/1996 | Chiang et al. | |
| 5,513,308 A | 4/1996 | Mori | |
| 5,532,422 A | 7/1996 | Chiang et al. | |
| 5,535,323 A | 7/1996 | Miller et al. | |
| 5,566,339 A | 10/1996 | Perholtz et al. | |
| 5,581,684 A | 12/1996 | Dudzik et al. | |
| 5,600,779 A | 2/1997 | Palmer et al. | |
| 5,615,296 A | 3/1997 | Stanford et al. | |
| 5,627,958 A * | 5/1997 | Potts et al. | 715/708 |
| 5,671,351 A | 9/1997 | Wild et al. | |
| 5,682,469 A | 10/1997 | Linnett et al. | |
| 5,699,486 A | 12/1997 | Tullis et al. | |
| 5,701,399 A | 12/1997 | Lee et al. | |
| 5,715,415 A | 2/1998 | Dazey et al. | |
| 5,754,176 A | 5/1998 | Crawford | |
| 5,784,643 A * | 7/1998 | Shields | 710/5 |
| 5,790,117 A * | 8/1998 | Halviatti et al. | 715/744 |
| 5,799,268 A | 8/1998 | Boguraev | |
| 5,923,325 A | 7/1999 | Barber et al. | |
| 5,964,839 A | 10/1999 | Johnson et al. | |
| 5,995,101 A | 11/1999 | Clark et al. | 345/711 |
| 6,002,400 A | 12/1999 | Loring et al. | 345/794 |
| 6,020,886 A | 2/2000 | Jacober et al. | 345/709 |
| 6,021,403 A | 2/2000 | Horvitz et al. | |
| 6,099,317 A | 8/2000 | Bullwinkel et al. | |
| 6,282,701 B1 | 8/2001 | Wygodny et al. | |
| RE37,431 E | 10/2001 | Lanier et al. | 706/58 |
| 6,388,665 B1 | 5/2002 | Linnett et al. | 345/473 |
| 6,611,878 B2 * | 8/2003 | De Armas et al. | 719/328 |
| 6,697,088 B1 | 2/2004 | Hollander | 715/744 |
| 6,714,976 B1 | 3/2004 | Wilson et al. | |
| 6,725,377 B1 | 4/2004 | Kouznetsov | 713/201 |
| 6,748,555 B1 | 6/2004 | Teegan et al. | |
| 6,871,348 B1 | 3/2005 | Cooper | 719/310 |
| 2004/0083453 A1 | 4/2004 | Knight et al. | |
| 2005/0027860 A1 | 2/2005 | Benson et al. | |
| 2005/0144150 A1 | 6/2005 | Ramamurthy et al. | |
| 2005/0147946 A1 | 7/2005 | Ramamurthy et al. | |
| 2006/0184410 A1 | 8/2006 | Ramamurthy et al. | |

FOREIGN PATENT DOCUMENTS

| | | |
|---|---|---|
| JP | 2008922 A | 1/1990 |
| JP | 4101737 A | 4/1992 |
| JP | 5197557 A | 8/1993 |
| JP | 10011248 A | 1/1998 |

* cited by examiner

SYSTEM AND METHOD FOR DYNAMIC ASSISTANCE IN SOFTWARE APPLICATIONS USING BEHAVIOR AND HOST APPLICATION MODELS

CLAIM OF PRIORITY

This patent application claims the benefit of priority, under U.S.C. §120, of U.S. Non-Provisional patent application Ser. No. 09/306,869, filed May 7, 1999 (now U.S. Pat. No. 6,340,977, issued Jan. 22, 2002), and the benefit of priority, under 35 U.S.C. §120, of Non-provisional patent application Ser. No. 09/989,716, filed Nov. 20, 2001 (now U.S. Pat. No. 7,047,498, issued May 16, 2006), entitled "SYSTEM AND METHOD FOR DYNAMIC ASSISTANCE IN SOFTWARE APPLICATIONS USING BEHAVIOR AND HOST APPLICATION MODELS. The entire disclosure of each are hereby incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

The present invention relates to software for assisting users, and, more particularly, to a system and method for interactively assisting a user operating an application program.

The rapid rate of development and proliferation of software throughout work, business transactions, and society have required a high degree of learning and absorption by users to properly operate and gain the advantage of such software. However, as more and more features are integrated into application software, the complexity and shear volume of diverse features can be overwhelming, even for experienced computer users. In addition, interfaces for applications have increased the possibility of confusion to the users in attempting to provide application operators with more choices for improved productivity. For example, stacked dialog boxes and a multitude of taskbars, icons, commands, and options have given users the opportunity to be more productive, but the very same increase in operational options has decreased the ability of a user to learn and thoroughly understand such application software.

Since software and application programs are being dynamically improved and distributed, the learning environment for a user is constantly and rapidly changing. Accordingly, a need exists for development tools and assistance software which guide a user through such complex and changing software environments.

In addition, computer applications typically provide exceedingly repetitive and uniform interfaces which, for example, confuse users by having icons appearing similar when having different functions in different applications. A need exists for an interface and/or an assistance system and method for guiding a user through different applications to properly use any given application despite similar application interfaces and commands.

Developments in accessing data for timely delivery have increased with more networking between computing environments, such as the Internet. World Wide Web (WWW) browsers and search engines as well as self-service and automation such as Internet-traversing bots and push technology have increased the productivity of users. However, such network-based environments also suffer from the indicated interface complexity issues.

Separate from application developers, third-party or remote software developers have developed assistance systems which aid users to use application programs with greater ease and productivity, for example, to quickly access the typically 5% of an application program most commonly used by typical users. Such assistance systems may be capable of working with the application program without accessing the internal operation of the application program code itself. Thus, separate assistance systems may enhance productivity and reduce the complexity of the underlying host application program.

However, in the prior art, such assistance systems are limited to generating help panes and dialog boxes, which occupy space on a display, which is relatively "valuable" from an interface-based perspective. For example, U.S. Pat. No. 5,825,356 describes a help system with semi-transparent windows for disabling controls, with the help system disabling buttons and interface screen icons and generating a static balloon to highlight portions of the interface. However, such highlighting balloons tend to clutter the displayed interface, and so are not effective in assisting users.

In addition, help or assistance systems and methods for software applications generally do not use overlays for display on the same interface screen as the software application, and do not have multimedia operations, so such prior art systems are not effective in assisting users. Furthermore, known help systems are pre-coded using, for example, script languages to handle predetermined commands and user actions, and so are statically fixed and incapable of run-time path determination to interactively assist a user to learn an application program. Such script languages also prevent third-party developers from rapidly creating new or improved production tools as the underlying application program is changed. Moreover, help systems are primarily created for single user operation, and so are not typically networked or network-compatibly for collaborative or real-time shared use by many users learning or using a common application program.

SUMMARY

A Cooperative Help Assistance (CHA) system and method provide real-time user assistance for one or more windows-based Graphic User Interface (GUI) applications or a single application's different subsections such as web pages, running concurrently in any operating system. The CHA System enables the development of an informative assistance object (obj) independently from the original source code or development environment of the target Host Application. The assistance object can be selected by any number of user interfaces from sophisticated inference-driven interactive interface search tools or categorized lists. By intercepting and monitoring a user's actions on a Host Application, the CHA system and method perform intelligent assistance in the context of the target host application program. Utilizing a specialized CHA Database which contains a Host Application Model, and numerous behavioral, resource and information objects, the CHA System and method dynamically assembles many elements in real-time or just-in-time operation, which makes the production of assistance sequences or elements efficient without having to necessarily code every interface path permutation. Paths can be dynamically generated from the Host App. Model.

Furthermore, the Model enables a real-time module to offer intelligent, contextual assistance as well as the real-time construction of automated, accelerated CHA Sequences or Procedures that require little or no user interaction. All pertinent assistance and information are processed and expressed by an extensive multitasking, multimedia subsystem in both two dimensional (2D) and real-time three-dimensional (3D) application interfaces, which greatly enhances and extends the effectiveness of any explanation or material expression. The production of Assistant Sequences is facilitated by the Host App. Model and 2D and 3D GUI "drag and drop" interface tools and in this mode does not require scripting languages or predetermined static programming. Scripting, however, is optionally accessible for specific or specialized tasks. By being adaptive across any number of processes and applications and different environments such as networks, the Internet, or stand-alone applications, the CHA System and method provide alternative and rapid solutions for the problem of presenting indirect, lengthy text explanations about using GUI applications and their often complex, abstract interfaces and procedures.

DETAILED DESCRIPTION OF THE PREFERRED EMBODIMENTS

Figure 1:
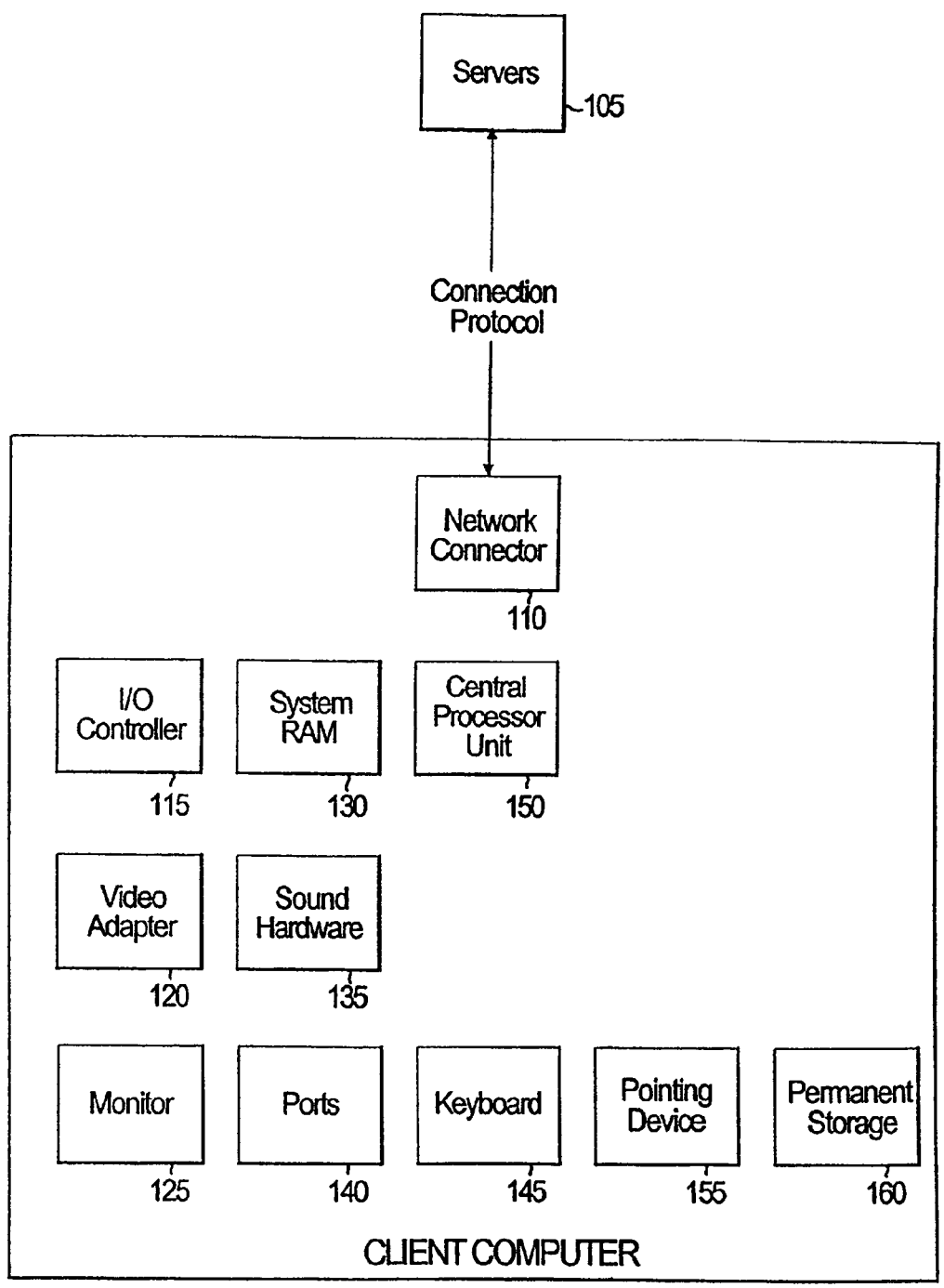
FIG. 1 shows an example of a computer system including hardware and software for implementing the present invention.

FIG. 1 illustrates a client computer and server for implementing and operating the disclosed Cooperative Help Assistance (CHA) system and method on or with a client computer. For example, the CHA system and method may be an application program or software executed by the client computer, which may be a personal computer, workstation, or other computing platforms. The Server 105, another computer distinguished by its server software, distributes data to many client computers and complements client processing tasks. The Network Connector 110 provides connectivity to external computers primarily servers. A standard connection protocol transmits and receives data in any format between remote computers. The client computer may include a number of subsystems connected together by an internal system bus. Instructions included in the system RAM 130 are executed by the Central Processing Unit 150.

Numerous external devices are connected to the Input/Output (I/O) Controller 115 via Ports 140 which provide a connection to external peripherals such as a modem on a serial port. The display of 2D and 3D graphics and video or any form of moving images is handled by the Video Adapter 120 that displays the graphics buffer on the Monitor 125. Sound processing is performed by the Sound Hardware 135 which may be capable of handling all standard operating system formats, such as a music industry standard such as Music Interface Digital Interface (MIDI), as well as sound or speech, text-to-speech capability, CD Audio, or any other known sound format. The Pointing Device 155 and Keyboard 145 transform user inputs into input data, with such user inputs generated from a user interacting with visual information as displayed. Permanent Storage 160 retains data between computer power off states, and is accessible, as needed, at run-time.

Figure 1A:
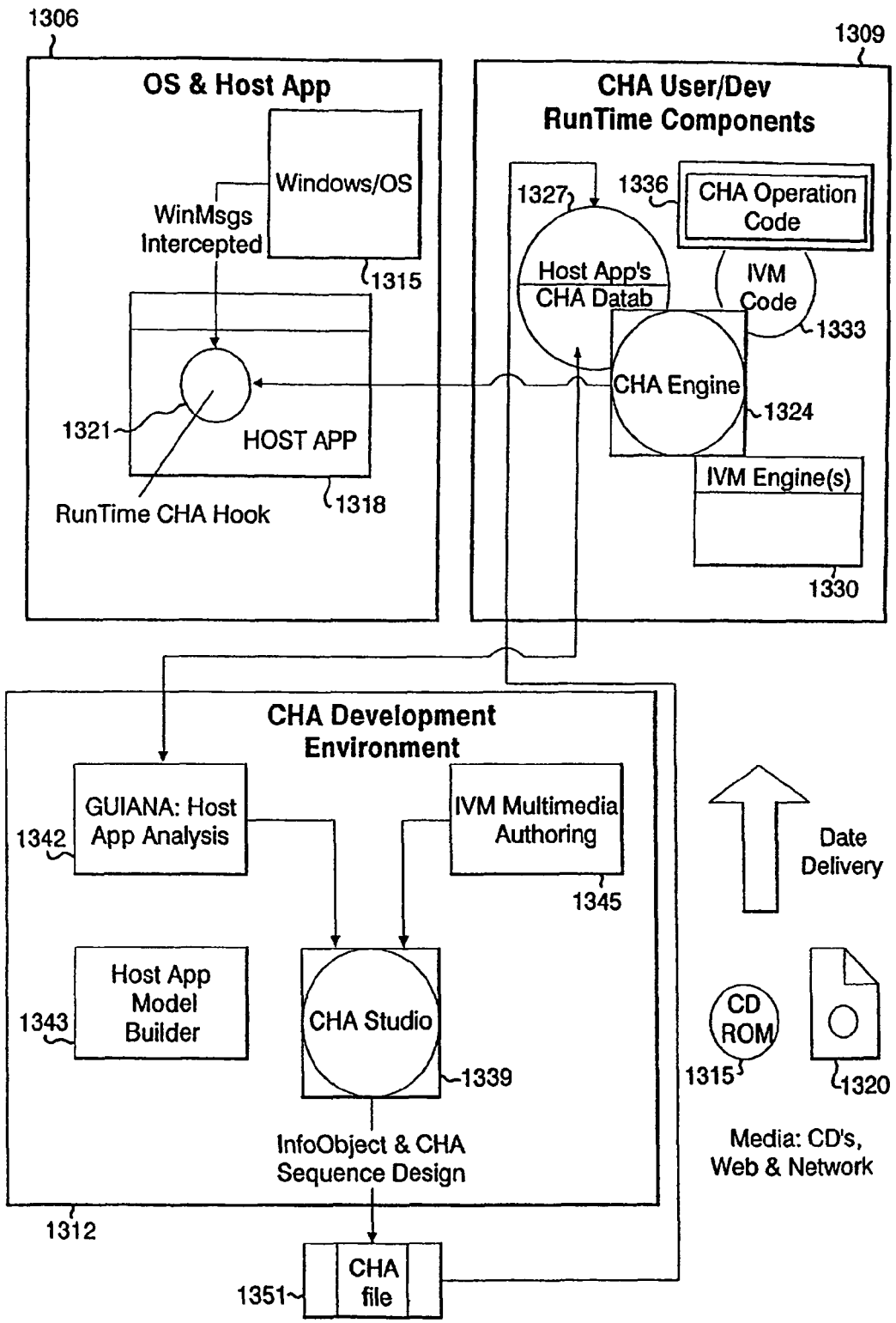
FIG. 1A shows portions of the computer system of FIG. 1 in greater detail illustrating different run-time components and some of the development tools used in analysis and the constructing of a CHA system and method.

As shown in FIG. 1A, the disclosed CHA system 1309 and method may be used in a computing environment in conjunction with a Host Application 1318 using, for example, a graphic user interface (GUI) or other known application interfaces, such as "MICROSOFT WINDOWS" 1315. The Host Application receives an injected CHA Hook component 1321 that intercepts and analyses operating system messages before generating events that are passed to the CHA Engine 1324. Furthermore, the CHA System 1309 and method include user and developer run-time components such as a CHA engine 1324, CHA Operational Code 1336, and an Interactive Virtual Machine (IVM) engine 1330 and IVM Code 1333. The IVM component is the Expression Engine which renders all visual and aural processes including animation, text, digitized speech, or any visual or aural feedback during the execution of assistance solutions. Data and other inputs may be received through the input devices 1315, such as a mouse, keyboard, a CD-ROM 1315, and network connections and protocols 1320, such as connections and interfaces to the Internet, the World Wide Web, and/or other networks and on-line services. The CHA system 1309 may also operate in conjunction with CHA Development Environment (CDE) 1312. This CDE contains a number of tools: a GUI Analyzer 1342, a Host App Model Builder 1343, IVM multimedia Authoring, and the CHA Studio which integrates data from 1342, 1343, and 1345 to produce the output CHA file 1351. The CHA system 1309 and the operating system 1306 with the Host Application 1318 may be implemented, for example, on an "INTEL PENTIUM"-based system using "MICROSOFT WINDOWS NT" to provide the GUI with known input/output devices, including a display, a keyboard, a mouse, etc.

The appearance of portions of a display may include, for example, the color, the shape, and/or the location of such portions.

Regions of the display corresponding to, for example, commands may have distinct and/or substantially defined boundaries from other portions of the display. Such regions may include icons, radio buttons, windows, task bars, tool bars, and the like.

The current screen position indicator (CSPI) is displayed on the GUI to relate a specifically active region of the display to the user. In particular, the CSPI may be a cursor of any shape and/or size, such as an arrow, or any other specific region of the display which is responsive to inputs from the user to reflect an active region for pointing and/or actuation by the user. For example, the CSPI may be responsive to user inputs corresponding to movements of a mouse device or a pointing device such as track pads or a light pen. Touchscreen inputs and infrared signals from remote devices may also be used to control the CSPI.

A region on the display is actuatable if, in response to a first input from the user having the CSPI associated with the region and in response to a second input of the user, a command or data entry is initiated. The region may be, for example, a clickable icon and/or radio button which the user may actuate by positioning, for example, a cursor "over" the icon or button and by pressing a mouse button.

Actuation of an icon or other interface items may include clicking a button on a mouse, such as a left or right button.

The CHA system and method uses a Host App Model that describes logically the entire interface, or subset thereof, of a Host Application, and facilitates many automated processes such as real-time assembly of the presentation of information or automatic generation of accelerated procedures.

Figure 2:
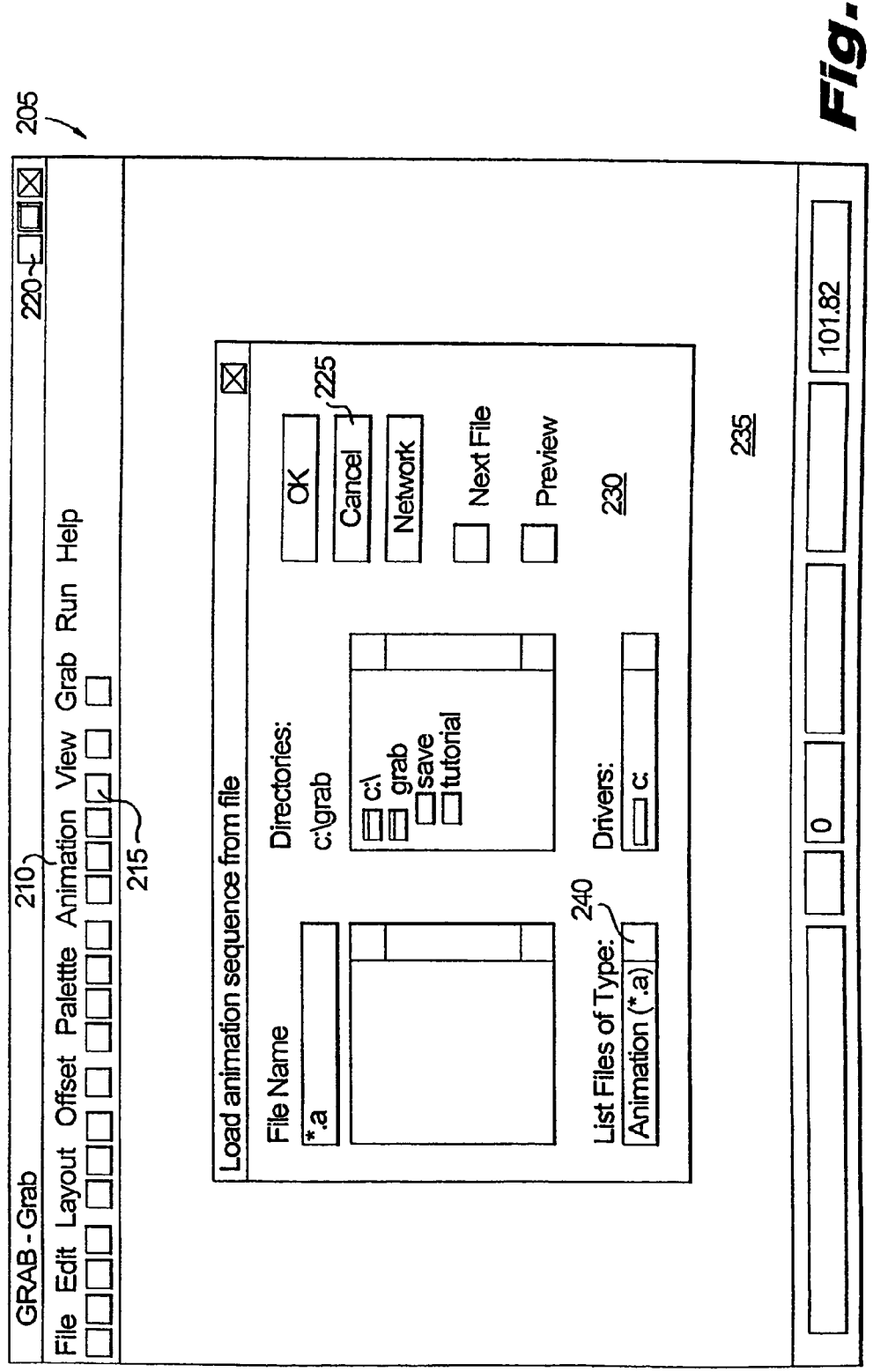
FIG. 2 shows an example of a typical application and interface for opening a file via a dialog box.

FIG. 2 illustrates a typical windows-based application having a main window, numerous child windows, and Graphic User Interface (GUI) objects or GuiObjs which are the application's interface objects that the user interacts with. This example shows a typical application written in the "MICROSOFT WINDOWS" environment and is also representative of any windowed GUI-based operating system such "X WINDOWS", the "APPLE MACINTOSH", and many others. In this illustration one can view the various GuiObjs which are the two-dimensional (2D) representations of various GuiObjs that react to user input from the keyboard, a pointing device such as the mouse, or any other input device. The title of the application is indicated at in the application's title bar 205, which is a GuiObj used to move the application's main window to different screen locations. More "global" control of the application such as minimizing the window, Changing window modes, etc. is done with the GuiObjs 220. Other GuiObjs of different application functions are located in various parts of the application window such as the Menu items 210 and the Toolbar items 215. In this example an OpenFile dialog box 230 has been opened in the main window 235, with the OpenFile dialog box 230 having been invoked by a GuiObj in the menu interface section 210.

Furthermore, The dialog box 230 determines different file functions, in this case a loading of an animation file type i.e. having a filename suffix *.a using the input field 240. Other GuiObjs are shown, such as the cancel icon 225 and the file type field 240. The different GuiObjs of different types are used as elements to determine CHA Sequences for performing the CHA operations. A Sequence is a sequential, step-by-step presentation of information via InfoObjs synchronized with the user's interactions with a Host App's GuiObjs. An InfoObj contains all the vital information being presented to the user. Any windows application, including any Internet browser, is a potential Host Application that can interact with the CHA System.

Figure 3:
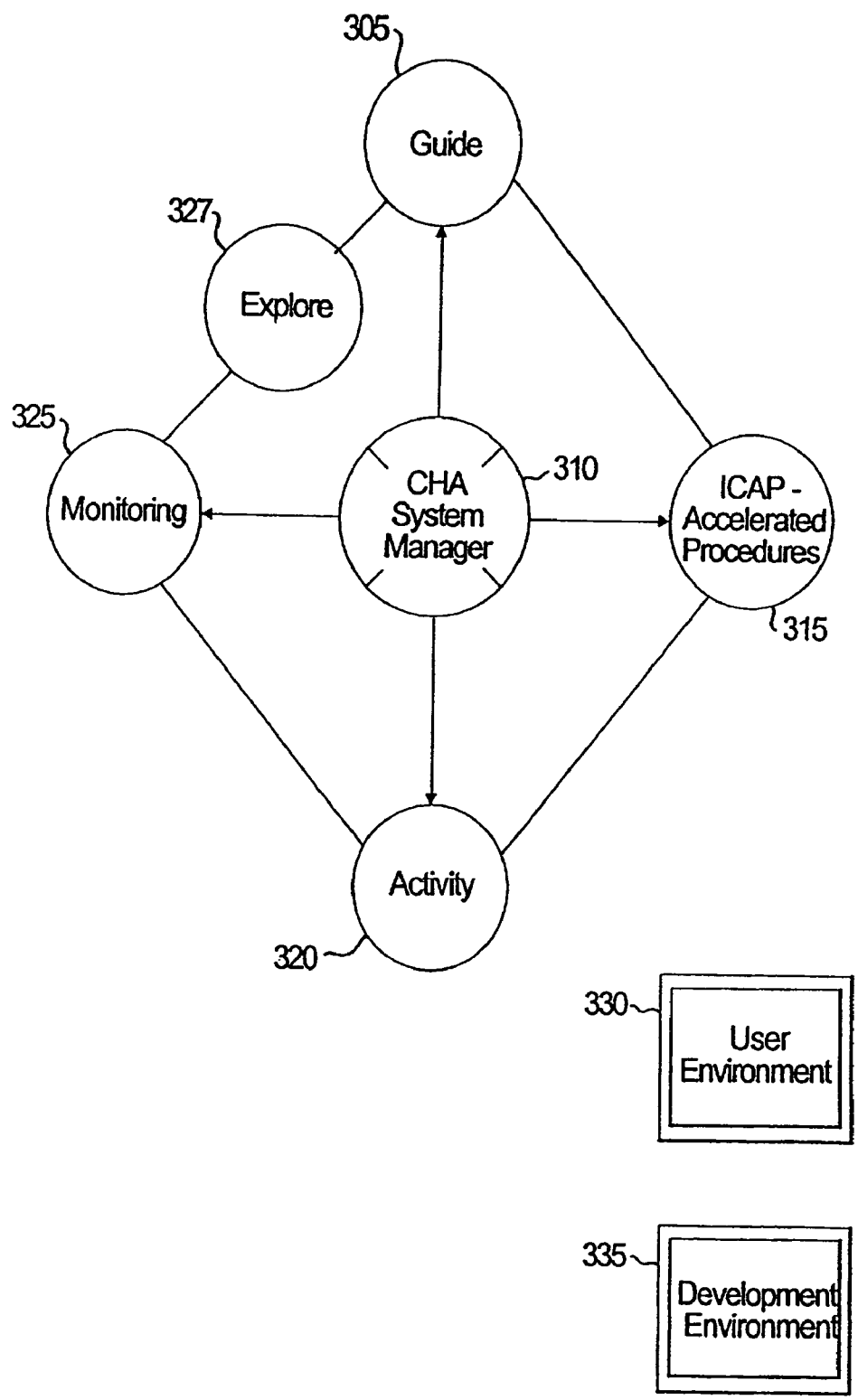
FIG. 3 shows the main Modes of the disclosed CHA System and method of the present invention.

Referring to FIG. 3, the various modes of operation of the CHA system and method are shown in relation to each other. The Guide Mode 305 performs step-by-step procedures are performed to be a basic guide to a new user. Additionally graphically expressive tutorials using multiple graphical, animated expressions can be used to lead the user through complex procedures. The Interactive Custom Accelerated Procedure (ICAP) Mode 315 provides interactive, customizable procedures that greatly accelerate the use of an application to increase productivity of the experienced user. In Activity Mode 320, an Adjunct Window is generated which can provide complex animated interactive activities that can be independent or that can communicate directly with the interface of a Host Application. Such operations in Activity Mode complement the user interface (UI) object overlays with extensive, additional detailed information.

Furthermore, the CHA System is available in two basic forms or versions: a User Environment 330 and Development Environment 335. The User version 330 is the user run-time version of the application that is released to the general user, while the Development version 335 is the form of the assisting application in which a CHA delivery application is created and its data assembled by the Application Expert. Tools that synchronize and target specific actions in the Host Application facilitate such delivery application creation and assembly.

FIG. 3 also shows the main divisions of operation of the CHA System having main groups: a first group having the principal modes of operation 305, 315, 320, 325, 327, while the second group includes the type of run-time versions i.e. Development vs. User. The high level CHA System Manager 310 acts as the master controller, which routes the processing for the setting of or exiting from different modes, and which keeps track and controls the overall state of the CHA application. Other functions might pass important data between the different modes or toggle between run time execution and asynchronous development actions.

In the first group, there are the five principal Modes of Operation: Guide, ICAP, Activity, Monitor, and Explore. In the first, the Guide Mode 305, the CHA System offers step-by-step guidance to any procedure of a Host Application on the live application. This mode 305 also includes tutorial-like activities during which the user participates in interaction with underlying logic, and the mode 305 includes processes that assesses the user's knowledge of the application. For example, after viewing the steps of a procedure, the program prompts the user to recall all the steps. As the user inputs each step, the CHA engine monitors and assesses the user's actions along the prescribed goal, and offers hints via an optional Guide Character or Character Group Set e.g. two or more characters in an ensemble, which are displayed to the user and which may interact with each other as well, to provide encouragement or discouragement, in a manner similar to a live teacher with or without a sense of humor.

All of the above activities in the guide mode 305 present material to the user in a wide variety of expressions from straightforward text to multiple-object animated objects, to show time or spatial relationships as pertinent to the procedure being used. The use of animation and concurrent processes can greatly enhance the learning process far beyond static textual forms.

The second mode is the ICAP mode 315, which provides control of the Host Application in an accelerated mode of operation such that the user performs dramatically fewer actions of an input device, such as the mouse or keyboard, to reach and use any functional parts of the application, no matter how deeply buried such functional parts are located in the interface structure. Facilities are provided to customize the procedure i.e. define the steps, goals and destinations, as well as to interact during the procedure. For example, if the user needs to make a selection during one of the steps of the procedure, the user is allowed to make the selection in the ICAP mode 315, as opposed to the common "macro" facilities found in many applications in which the user records steps or actions but cannot make choices during the operation. In conjunction with the Host App Model, the user can very rapidly navigate to any part of the program. Furthermore, ICAP can be considered a Guide Sequence process except with InfoObjs and Commentary objects suppressed where many Host Application controls, Host App Model interaction, operating system controls, and other related CHA System mechanisms being similar or identical to the Guide Sequence. One skilled in the art would recognized that an adaptation from Guide Mode Fixed or Dynamic types to ICAP Mode mechanisms may be readily implemented.

The third mode of operation is Activity Mode 320. Although this mode 320 may appear to be removed from the Host Application, this is not necessarily the case. First, this mode uses an Adjunct Window 320 in which a wide variety of expressions or interactivity can be performed, ranging from static text or graphics, to fully interactive, lively and animated multimedia-rich applications including rapid paced games. In Activity Mode, the objects in the Adjunct Window are linked or associated with the live application. For example, if the user drags and drops an object inside the Adjunct Window, an event can be generated that sends a message to the Host Application, and one of its GuiObjs may then be activated such as to perform the opening of a dialog box.

The term "GuiObj" used herein refers to a logical, virtual entity in the CHA System which is used for the Host App Model representation. The actual "physical" application interface controls are managed by the operating system's internal data structures e.g. window handles or window class structures, etc. In the CHA System, GuiObjs have associative SysGuiObjs that enable respective mechanisms for the manipulation or internal interaction with interface objects that are manifested to the user. When the user is interacting with a GuiObj, the SysGuiObj is inextricably bound together with the GuiObj. In reference to an interaction with a GuiObj, the SysGuiObj i.e. the actual "physical" properties provided by the operating system and hence, its interfacing with input hardware, is implicit. For example to say that a user clicks on the GuiObj, the user is actually interacting with the physical properties of the operating system but concurrently the GuiObj is placed into a context within the Host Application Model via mechanisms that use it.

Additionally, events occurring or being performed in the Host Application can also generate a message to an object inside the Adjunct Window application to activate an animation that illustrates an underlying process occurring in the Host Application. In general, the Adjunct Window complements the Host Application and augments the expression output to the user for the explaining of a Host Application's organizational concepts or principles and details. With the Adjunct Window, complex animated interactive activities may be provided which can be either independent or linked i.e. communicate directly with the interface of a Host Application.

The fourth mode shown in FIG. 3 is the Monitoring Mode 325 which collects all user input into a database for either real-time or post-operation analysis. In this mode 325, detection of usage patterns determines the presentation of different options or solutions to the user for more efficient use of the Host Application program, which may be in context such that, as the user indicates what the overall goal is, the Monitoring Mode 325 can use an Inference Processor in conjunction with ChaDB's Host App Model to suggest what the next steps may be, or alternatively present other options in different areas of the program. During every use or session of the Host App program, the CHA system collects a user data set. After the user stops using the Host App program for a given session, post-operation analysis is performed to determine any patterns from the user data set to generate a usage report. Furthermore, from the Post Analysis, ICAP procedures can be built automatically for the user and placed in a list for later access.

The fifth mode shown in FIG. 3 is the Explore Mode 327, which allows the user to randomly access any part of the entire interface of the Host Application, and to receive embedded InfoObj presentations stored in application's ChaDB.

In FIG. 3, the Development 335 and User 330 versions of the CHA System relate to the development time vs. actual run-time form of the data and code that is available to the user. In the system, the distinction between User and Development is naturally related to the access rights of the user to certain functionality and to the provision of a set of probing tools for analyzing a Host Application and for preparing the assistance functionality for the targeted program.

The CHA system provides a mechanism to coordinate and synchronize events across multiple application processes, for example, to begin a CHA sequence on the browser followed by events taking place on one or more applications, and then returning again to the browser. The CHA System Manager 310 handles this coordination of CHA Events and Messages. The user, upon requiring assistance or wanting guidance about a particular topic, can select from a list of choices provided by the CHA system.

Figure 4:
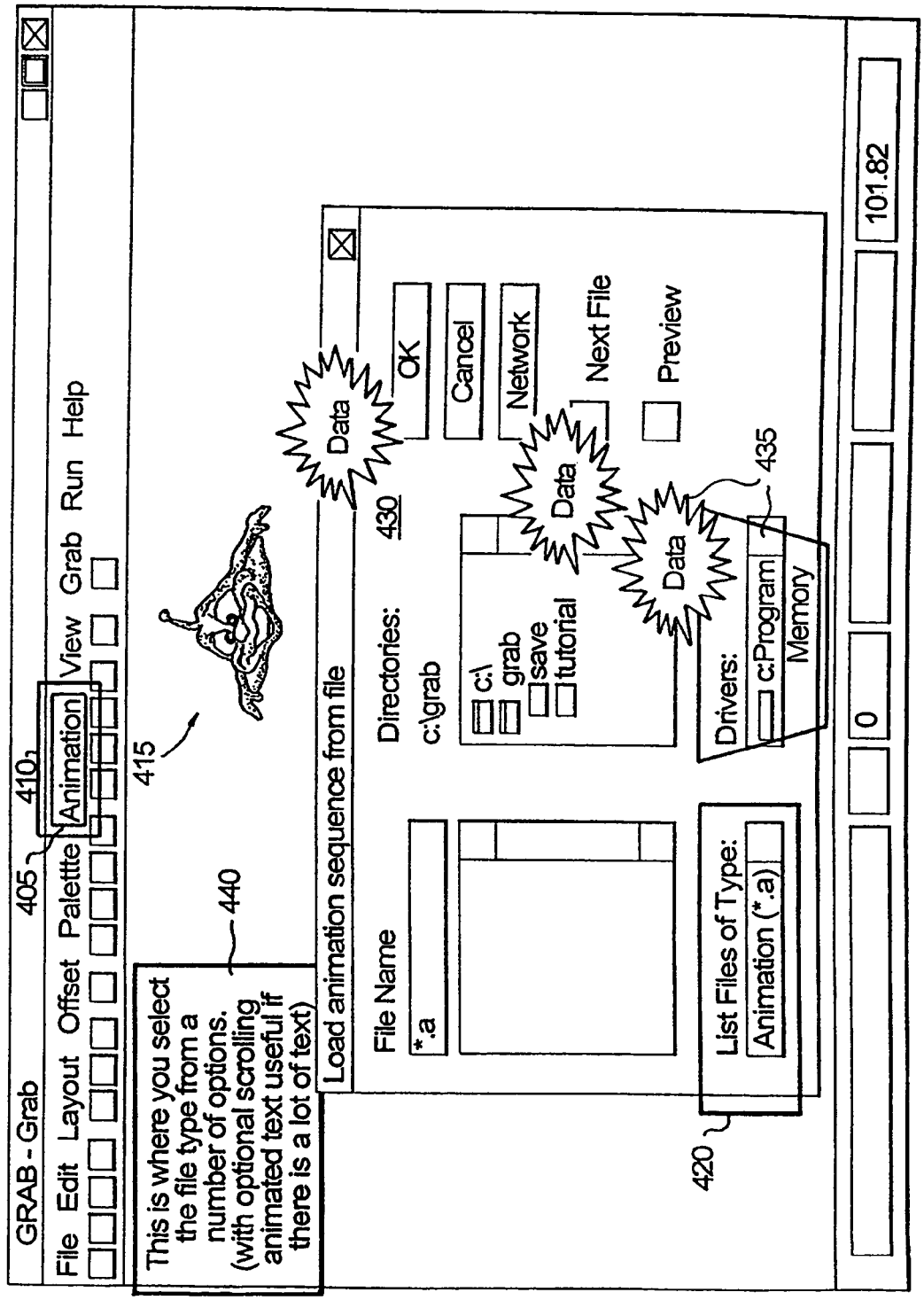
FIG. 4 shows a CHA Interface Overlay with a Guide Character and Text InfoObjects.

FIG. 4 shows an example application with two types of assistance enhancements i.e. text and animated objects, GuiObj Highlighting 405 and an interactive Guide Character 415. The Guide Character provides a point of focus for the user during use of the Host Application and the CHA system to provide a friendly personification or image to describe the Host application's logic or operations. The first Highlighting Effect 405 associated with the Animation Menu is implemented using moving graphics, as suggested in FIG. 4 with the nested outer rectangles 410 which represent multiple, animated frames. The second Highlighting Effect 420 is another indicator that directs the user to an interface object as another part of the presentation sequence, and the second effect 420 is triggered by a stream of events which synchronize the Guide Character 415. The Guide Character 415 can also be displayed in conjunction with the processing of a sound or a voice file to aurally convey information using an audio-based mechanism of the operating system and/or computer system running the Host Application program and the CHA system. The CHA System can control any number of multitasking objects such as Highlights 405, 410, 420 of the GuiObjs because of its multitasking architecture, and the CHA System can maintain synchronization over all presented events, user input events, and other streamed events produced by the Guide Character's underlying logic.

An InfoObj is attached to and/or associated with the Highlighted Interface GuiObjs 405, 410, 420 such that, if the user moves the interface window 430, the display of the InfoObj remains attached and follows the window 430. It is important to note that the term InfoObj refers to all the essential information being conveyed in whatever format. Such a format could be visual i.e. text whether static or animated, graphic representations, in 2 or 3 dimensional form, or aural i.e. digitized speech. Or in combination i.e. video, interactive illustrations, and so on.

The CHA system uses Overlays, which are User Interface Overlays in combination with InfoObj presentations or overlays as well as the Guide Character presented as overlapping or covering portions of the live application, as opposed to separate help rectangles with help messages. The Guide Character is the representation of the source of information and help functions. The Guide Character adds a friendlier nature to the help experience and eases the user into the complexities of the Host Application program. Furthermore, the Guide Character can be an abstract representation and is not required to be only a visual or animated character. In addition for illustration, items 435 are animated objects that are superimposed on top of the application's GUI interface and are used to convey some concept such as in this example the data being loaded into program memory. An additional expression of an InfoObj, FIG. 4 further demonstrates the substitution or complementation of text objects 440 for sound objects as used and presented by the character 415. The presentation behavior of the text uses numerous techniques that range from static text with scrolling controls to scrolling in any different axis to animated effects. Animated text along with display controls are important to handle text that occupies a display area larger than the initial window. Additionally the benefits of text is its relatively small data size that is vital to networks with slow transfer rates.

Another example of a further variation for CHA Applications, the CHA system may also operate in a "Recall Activity for Learning" procedure, which is a CHA sequence with additional interactive properties. In reference to the Guide Sequence as described previously in FIG. 4, the CHA Sequence has demonstrated to the user where the correct interface objects are, and has presented a sequence of steps. Upon completion of the Guide Sequence, similar to the game "Simon Says", now the CHA system simultaneously displays a character 415 on the interface, and asks the user, through the character 415, "what's next?" and makes comments, which may be visual and/or aural, as the user inputs each step. Intervals of time are measured, and if the user does not respond within a certain amount of time, hints from the CHA system are given to the user. This provides positive reinforcement and active learning. As the user reaches the end of the sequence, the character 415 may say "you're almost there" or "just one more step". Then "good!" may be stated by the character 415, upon completion of the user operations. The character may be given different personalities.

Figure 5:
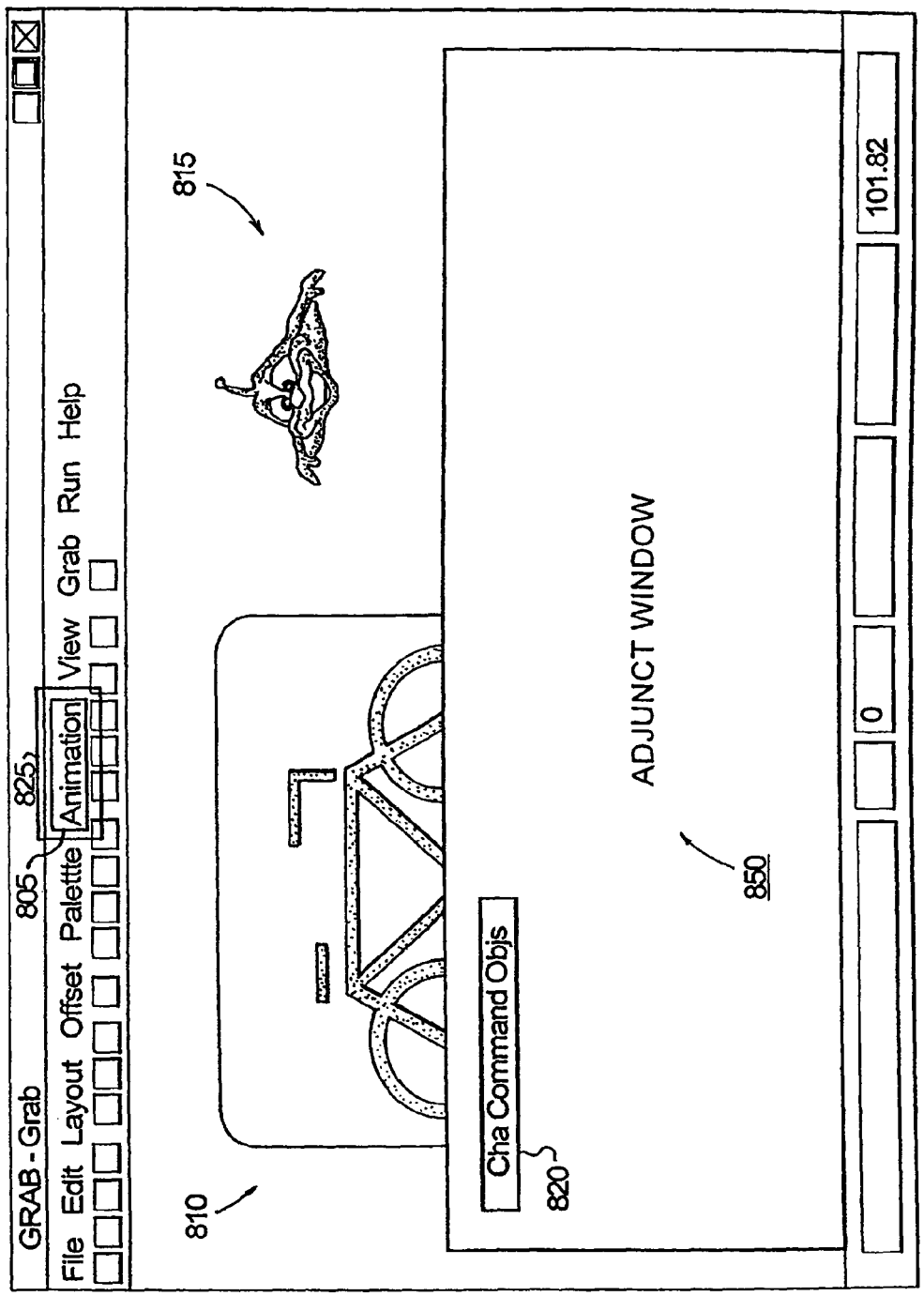
FIG. 5 shows a CHA Interface Overlay with an Adjunct Window where complex animated interactive activities run independently and communicate bi-directionally with a Host Application.

FIG. 5 illustrates the use of an Adjunct Window 850 that coexists and is displayed with the Host Application. Besides the Host App's GuiObjs e.g. menu items 825, shown also with Animated Highlighting 805 and the Guide Character 815, the Adjunct Window 850 is a general purpose view area for providing different functionality from Activities which are interactive applications, to network activities such as online chat. The CHA Activity invoked in the CHA Activity Mode is a complex and robust multimedia expression and information presentation that is intended to complement, illustrate, or clarify underlying concepts behind the operations being demonstrated on the Host Application. Running on its own process, the Adjunct i.e. Activity Window 850 provides an independent method for handling any type of data display in any format such as graphics, video, and text. For example, the Adjunct Window 850 may be used to present an overview map of the entire Host App's interface to display in context where the user is currently interacting. Furthermore, the Adjunct window 850 can also be used for providing high speed interactive applications serviced by the CHA System's IVM Object using material relevant to the operation being described in the Host Application by the Guide Character 815. Events occurring in both the Host Application as well as in the Adjunct Window 850 are not necessarily independent, or the Host Application and the Adjunct Window 850 can be closely synchronized through the CHA System's internal messaging. Messages can be sent from either the Host Application to the Adjunct Window Application or vice versa. Handling procedures can receive messages in either direction and take appropriate action.

The Adjunct Window is different from an activity window describe herein. The Adjunct Window 850 is an auxiliary and complementary part of the operations in the Guide Mode 305 for use with the assisting Guide Character 815. The graphic representation 810 may be an image file being displayed by the Host Application which, in this example, is a graphics processing program. The CHA Command Objs 820 are optional interfaces that provide a controlling functionality for the Guide Sequence being processed such as pause, exit, and resume.

In conjunction with the use of interface objects to highlight synchronization with a multitasking engine, CHA sequences involving multiple actuations, such as user inputs through GUI icons and buttons. If multiple buttons are involved in a CHA sequence, the Guide mode 305 can illustrate all of such buttons simultaneously and can maintain necessary states from step-to-step step. In addition, "Scanning" Interface Objs in the CHA Sequence may be performed, such that the CHA system quickly "scans" the icons or other actuatable regions on the display involved in the sequence in a "gestural overview". For example, for three icons involved in a given CHA sequence, the three icons are highlighted on the display quickly in the order in which such icons are to be used to give an overview of the procedure to the user.

The CHA system also illustrates auxiliary processes, by providing animated illustrations as opposed to static text, which allows the CHA system to provide the expression of far more complex graphical interface or structural relationships, such as illustrating other alternatives or possible branches of the Host Application program. In addition, as highlights are executed, an additional window may be provided which displays animations that illustrate different stages or internal data structures or states that reflect how operations are performed by a Host App that may not be obvious to the user, such that a frame can include animations, or provide an interactive interface for describing layers of information that run concurrently as buttons are highlighted or as a user actuates a button or icon; for example, if the user presses a button to print hardcopy information through a printer. Although many uses of the CHA system may include simple illustrations of the Host Application program, the CHA system may also assist to demonstrate applications that are meant to accomplish specialized or custom features, as well as illustrations of processes as such processes interact with interface objects, so such demonstrated applications and processes can be powerful learning tools. While known assistance systems may emphasize text to inform a user, the CHA System includes both text and multitasking multimedia expression along with optional network connectivity.

The Adjunct window 850 shown in FIG. 5 may be displayed through the GUI as though mounted on a rotating three-dimensional (3D) object, capable of rotating in response to each CHA Sequence Step (SeqStep), which provides strong interface, help, and identity of style of the CHA system. Some enhancements of the presentation of InfoObjs include a step-by-step approach to assist users. In the prior art, help systems may take a step-by-step approach and present all steps to the user as an enumerated list. CHA implements the steps and also presents the steps to the user one step at a time to reduce screen clutter and to allow the user to focus on a single step at a time. As the user interacts with the actual interface, steps of the CHA Sequence or procedure are executed. In addition, more than one CHA event can take place for multiple interactions with multiple interface objects.

Using the Expression Engine, superimposed graphical effects can also be used to emphasize elements of the interface. For example GuiObjs displayed on a screen which are not part of a CHA Sequence can be "diffused", that is, a mask bitmap is laid over the entire interface with regions in the mask as windows or "holes" for enabled GuiObjs to be displayed therein. The mask bitmap is "grayed" out i.e. defocused or colored differently to simplify the correct interface for the user, and overlaid the interface of the live Host Application.

Figure 6:
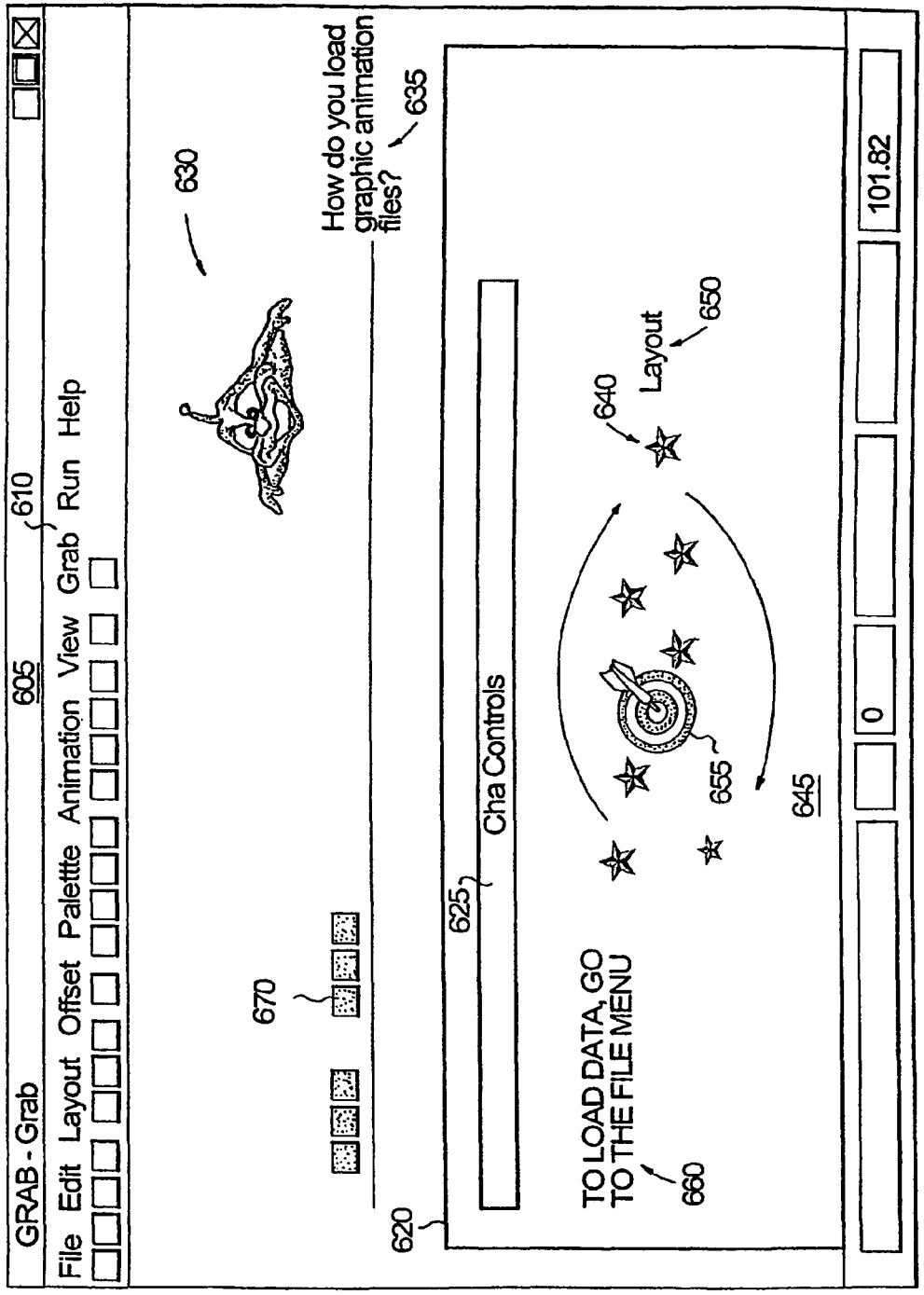
FIG. 6 illustrates CHA Activity With Host App GUI Linkage.

FIG. 6 shows the basic Activity window 620 in relation to the Host Application 605 and its GuiObjs e.g. 610, containing CHA Controls 625 along with the character 630 who coordinates events between the Host App and the Activity Window. CHA Controls 625 contain interfaces for main control of the Activity Window and its general operation and processing such as termination of the Activity, closing of the Activity, and so on. The purpose of the CHA Activity Window is to present a user with an interactive program i.e. Activity which illustrates a concept or aspect about the Host Application or provides training. Although appearing in a separate window and possibly internally in its own operating system process, this Activity program is still linked for bi-directional communication with the Host Application.

In the given CHA Activity example for the Host App it is the intention to teach the user about the location and relation of different commands that are accessible via the GUI interface by asking questions. The presentation of activity can be thought of as a multiple choice question except that the response controls are animated instead of being static yes/no check boxes. For example, the character 630 first asks the user a question via voice or text such as 635 "How do you load graphic animation files?". The given activity uses the CHA System's Expression Engine that multitasks and animates 645 a set of N graphical objects 640 i.e. star shapes, where each star represents one GuiObj and responds to user mouse clicks. In this scenario, as the objects move around the Activity Window, with the pointing device, the user interacts with any of the star objects with the intent to reveal its associated GuiObj label. As this event is generated through this interaction, a GuiObj text name 650 appears.

The user continues revealing GuiObj text names until the correct response to the initial question is found. With a correct response at this point a visual cue is revealed i.e. the dart in the target 655 as well as a text message 660. The star shapes 640 stop their animation. Concurrently as the target is drawn, a message is sent to the Host Application and through the CHA System's application control mechanisms, the appropriate menu item 665 and related GuiObj e.g. toolbar 670 is opened. The character 630 may also respond with positive reinforcement expressed as digitized speech or text. The benefit of the activity is to provide animated effects and other multimedia processes to create interactive programs that help to reinforce important concepts and learning about an application. This simple example illustrates one of endless varieties of interactivity that complements the traditional help in applications. Programmability of the interaction is completely flexible within the limitations of the Expression Engine and its ability to communicate with the main run time components of the CHA System.

The CHA system may be considered or deemed, or may be incorporated as, an extension to the operating system in that the CHA system provides an intelligent layer between the user's input and the functionality and interface presented to the user via the Host Application and additional interfaces provided by the CHA system. The function of the CHA system as an extension may be a platform from which specialized operations may be customized by third-party developers to greatly simplify operation of an application to achieve useful functionality. Multitasking user interface overlays and InfoObj overlays may also be used.

Customized application hook-interfaces and subclassing components are used in the operating system with a live Host Application program without access to the internal code of the application program, except through public OS interfaces, for example, the "MICROSOFT WINDOWS" Common Object Model (COM) object interface technology supporting, for example, browser internal component e.g. COM objects. Through the Host Application GUI drivers (App GuiDrivers), the CHA system operates to allow for customized enhancements or facilitators for more efficiently or accurately setting the hooks into the host application program for identifying or analyzing run-time user input for a given host application which provides for any exceptions to the general or released versions of the CHA run-time engines. Interface drivers are also provided as GuiObj handling routines for different classes and types of GuiObjs. These handling routines are used to control a given Host Application. Such App GuiDrivers include algorithms and handler routines for the detection and mapping to the logical version of all GuiObjs in a Host Application program.

Figure 6A:
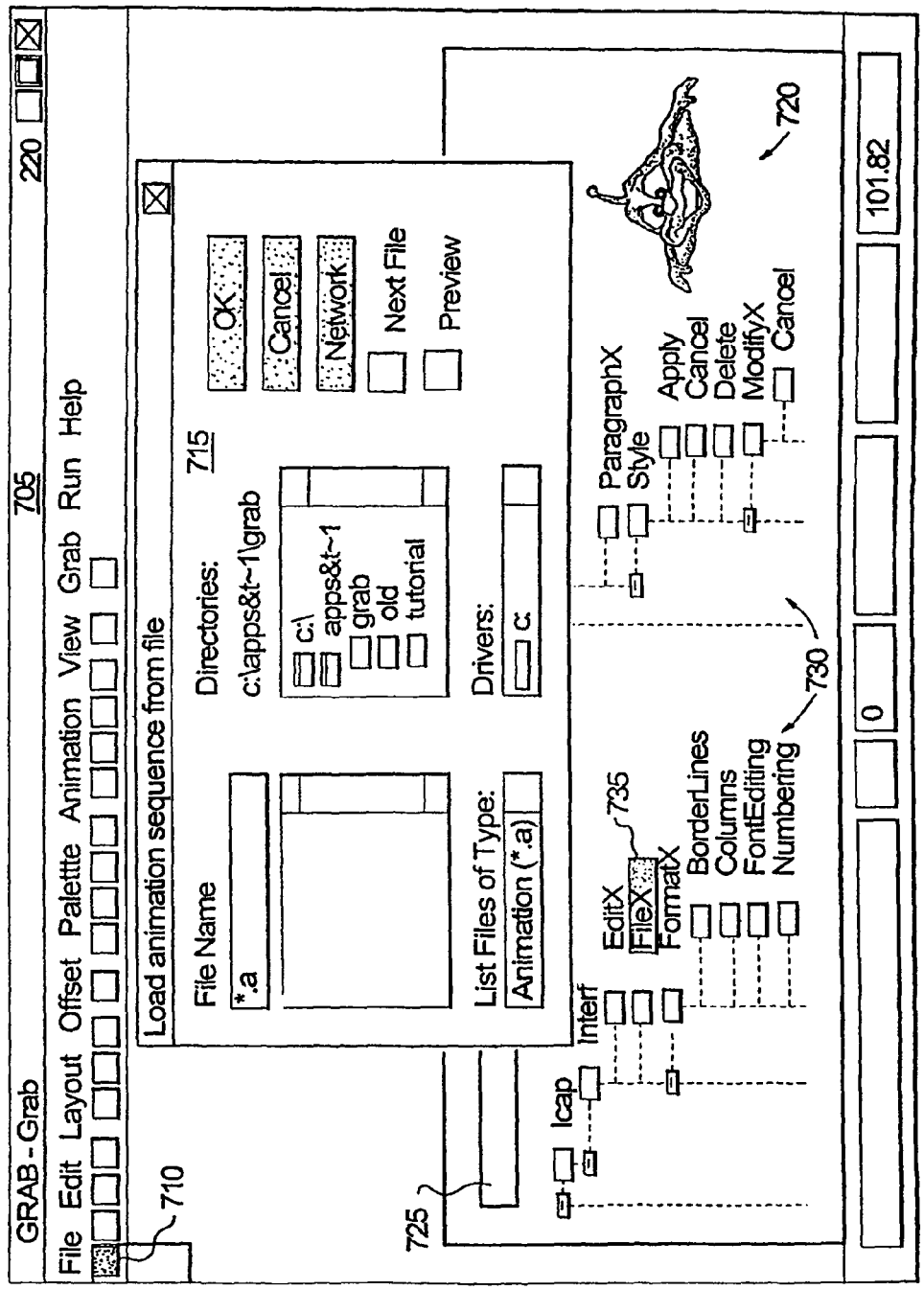
FIG. 6A shows an ICAP control map.

FIG. 6A shows an ICAP Map Tool 720 that provides an interface 730 to a symbolic representation of the Host App's 705 GUI interface. This symbolic representation is linked to the "physical" GUI interface of the Host Application such that selections or actions on the symbolic version can result in correlating actions on the actual application. In this example, the selection of the item FileX 735 triggers an internal message that invokes a process that results in the opening of the dialog box "Load animation sequence from file" 715 via actions on the menu 710. The panel of CHA controls 725 provide commands that invoke different processes of the ICAP Map Tool and different controls for various CHA System operational methods that influence the Host Application.

Figure 7:
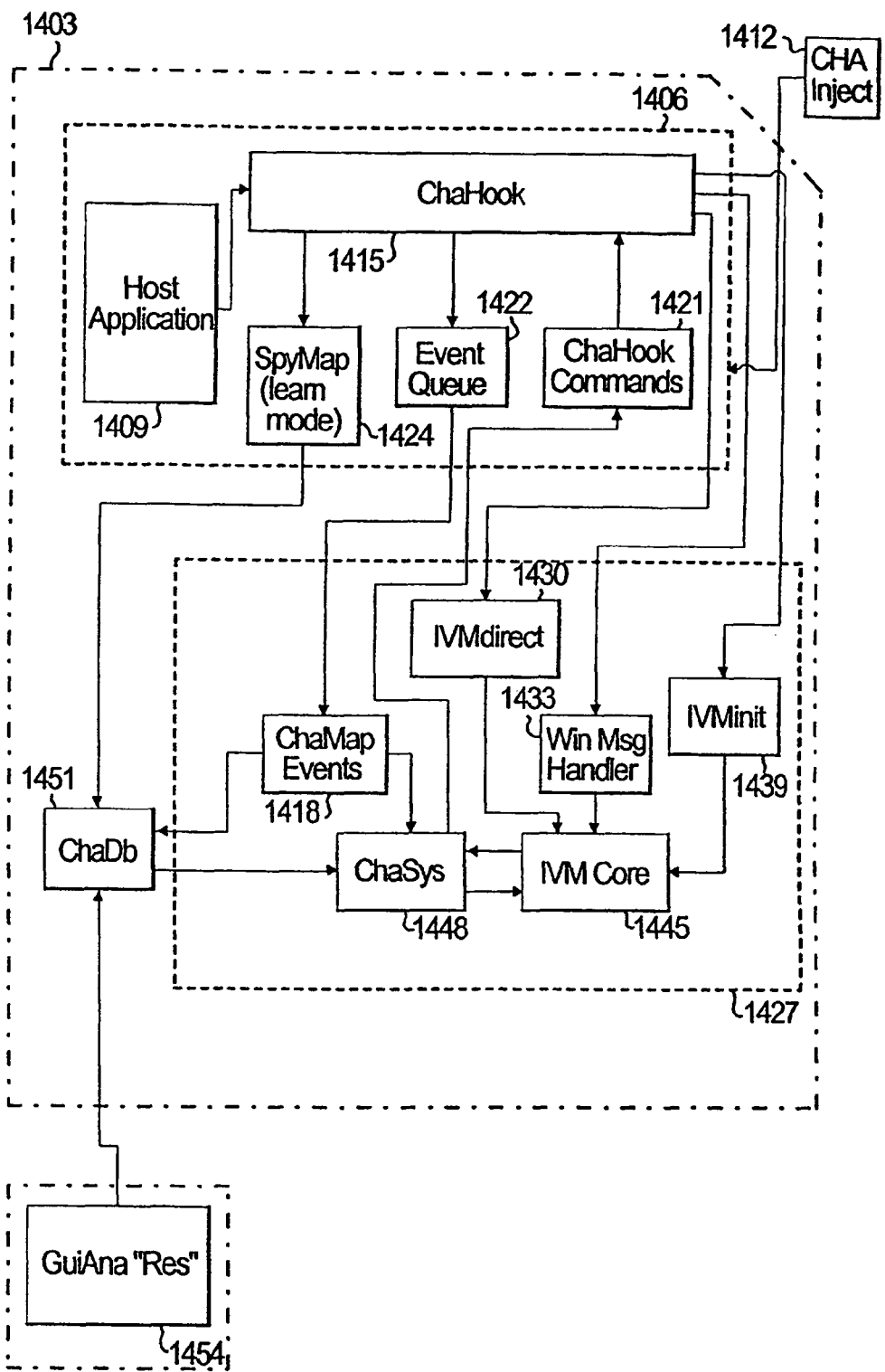
FIG. 7 is an overview of the CHA run-time engine modules.

FIG. 7 illustrates the major run-time CHA components included in the CHA system 1403. With the Host Application 1409 running and ready to be setup for CHA operation, on initialization, the CHA inject program 1412 executes and initializes all CHA components serviced by their own respective program threads 1406 and 1427.

The user action interception function may involve "MICROSOFT WINDOWS"-based subclassing and uses Hooking Functions such as SetWindowsHook, UnhookWindowsHook, and CallNextHookEx, and is responsible for intercepting all operating system (OS) messages before and after such messages are processed by the Host Application. The Hooking Function may be different in targeting various categories of Host Applications. For example, if the Host App is a stand-alone application such as a word processor or a spreadsheet program, then hooking may be performed on the "WIN32" API level where message interception is performed on a relatively low level. On the other hand, if the target application is a web browser, then the interception function may be performed with the detection and analysis of messages on an object level as defined by the HTML Document Object Model in "MICROSOFT INTERNET EXPLORER."

Other applications are achievable with a similar model. Because the disclosed CHA system includes Hooking Functionality, adaptation to new applications or even different operating systems is relatively straightforward with many shared resources across the different platforms.

The ChaMap Events module 1418 filters out the many operating system messages received, maps the referenced OS objects to GuiObjs in ChaDB, and translates the messages into logical CHA Events which are handled by the ChaSys component 1448, which acts as a central coordinating unit for the CHA system. The logical mapping of the OS messages and objects enables the adoption of the CHA System to any OS or application since the OS dependent messages are encapsulated in a single Translator Unit for convenient mapping. Module IVMinit 1439 initializes the IVMCore 1445, which is the main service component for the multimedia expression of any event such as the beginning of an animation, a character interaction, spoken instructions, the provision of extensive interactivity, etc.

ChaSys has a logical view of the Guide Sequence, including the GuiObj view i.e. all GuiObjs that must be present during the time interval of the InfoObj presentation, and maintains synchronization with user actions on GuiObjs with the presentation of InfoObjs. ChaSys has the ability to suspend or interrupt the InfoObj Services Module i.e. the process in the Expression Engine, and to move the Sequence Step (SeqStep) either forwards or backwards. The Guide Sequence processing may make adjustments midstream, if necessary, so either User Actions are controlled or the Guide Sequence and Expression Engine are adjusted.

During run-time, the CHA system accesses the ChaDB 1451, which is the CHA Database of collected data related to the Host Application that is prepared prior to operation of the CHA system, with the ChaDB being in the CHA format and consistent with the Host Application Model for efficient run-time operation and data preparation. The GUI Analysis Resources (GUIana Res) component 1454 part of the CHA Development Environment is used during the CHA application production process, with the primary goal of the GUIana Res 1454 being to collect pertinent information via a SpyMap component 1424 during a learning mode for learning the operation of the Host Application, and to prepare CHA data formats used during run-time.

The Event Queue 1422 is established to asynchronously collect and transmit messages from the Host Application to ChaMap 1418 which passes filtered and processed data to the ChaDB module 1451 as well as CHA Events to ChaSys 1448. ChaSys operates as a central managing coordinator of numerous processes.

In "MICROSOFT WINDOWS", subclassing is a mechanism which is provided to allow for the establishment of an intercepting routine or function to monitor and process messages before or after such messages are passed on to the Host Application. Such interception functions permit control of the behavior of the Host Application and the adding of additional functionality which may not have originally existed in the Host App, such as the invoking of new functions, the disabling Host App GuiObjs, etc.

Figure 8:
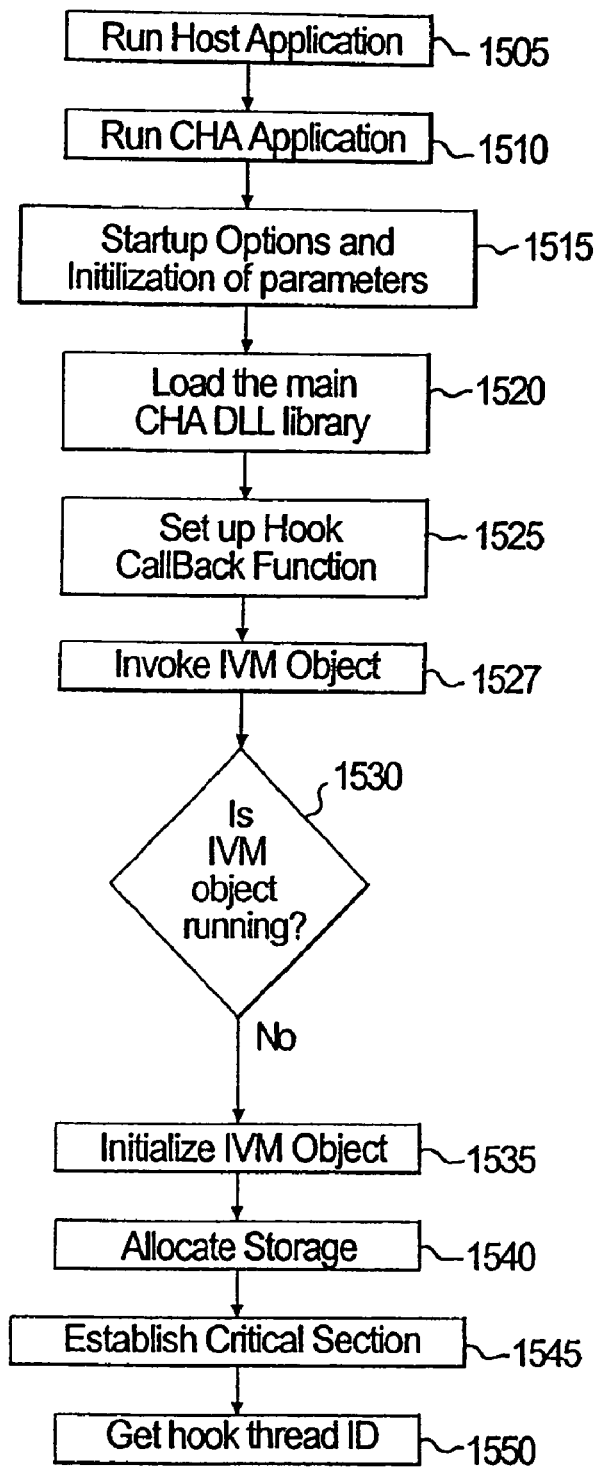
FIG. 8 illustrates CHA Run-Time Component Initialization.

Referring to FIG. 8, the Host Application has been launched in step 1505 and is running in the operating system. Part of the basic system of the Host Application is a process allocated by the operating system and one or more running threads such that the process handles the multitasking within the Host Application program.

On initial launch in step 1510, the CHA system loads its critical components into memory and also establishes links with existing operating system services to prepare to perform the CHA processes. Initialization options are accessed in step 1515 from an external file e.g. .ini file or other data registry which is optionally in ASCII or binary form, and the CHA system sets up various initialization parameters such as a file path for CHA System components, communication parameters such as network information, as well as information about the target Host Application such as window class structure identifiers which aid in the identification of Host App windows and other GUI objects, etc. After the Initialization Options are read, the operating system global data repository such as an operating system Registry, is read and additional CHA program values, such as directory paths, general system capabilities, and/or the CHA program identifying key names are fetched and stored for later reference.

An additional method of passing parameters to the program is performed via the command line which is a convenience for launching the program in different Main Modes, for example, for running the CHA application in a debug mode to assist the development process. The initialization process then performs a quick look into the operating system to seek and locate the main window handle for the target Host Application. The handle allows all existing windows to be enumerated, and a match is sought for the key window identifier found at the end of initialization in step 1515. In many modern operating systems, the dynamic link library (DLL) or its equivalent is typically employed which provides the capability of automatically loading and running external re-entrants, that is, shareable code in an already running process. In such situations, the CHA System first attaches itself to the Host Application which is already running in the operating system via a special function, for example, the LoadLibrary function in "MICROSOFT WINDOWS", for finding and loading the specified DLL file in step 1520.

Thread determination specifies whether the DLL runs in its own thread or not, and such thread determination has shared memory implications. The main CHA.DLL file is loaded, after which the OS generates a message, for example, a DLL_PROCESS_ATTACH message. Upon the receipt of this message indicating when the DLL "attaches" itself to the process, pointers to callback functions in step 1525 are setup which are mainly functions for receiving, filtering, and pre-processing messages before they are sent to the Host Application 1505.

An Interactive Virtual Machine (IVM) is then loaded or invoked in step 1527 which is the primary multimedia services engine which acts as an Expression Engine for many different graphical events that are synchronized with sound, and which also enables high performance interactivity. On receipt of the initial create message, for example, MPH_IVM_CREATE, a test is performed in step 1530 to see if the IVM object is already loaded, and the CHA system proceeds to initialize the IVM object in step 1535 where an IVM thread is created to enable IVM code processing. During the initialization stage, memory is also allocated in step 1540 for general purpose use in the IVM engine, with such memory also known as a heap.

Communication between different "MICROSOFT WINDOWS" OS processes or threads and the creation of synchronization objects can be implemented in a number of ways from and including shared global system memory queues, mutexes and critical sections to Windows Message Queues. In the first i.e. critical section technique, for additional connectivity to the Host Application, the API function InitializeCriticalSection( ) in the OS is called in step 1545 which establishes the ability to pass data safely between different threads and to synchronize between many different messaging events between various CHA components and the Host Application.

Once the MPH_IVM_CREATE message has been processed and an instance of the IVM object and thread have been created, step 1550 is then performed in which additional hook information is then passed to the next procedure in the "hook-chain" which is one of a series of callback functions called at intervals, depending on user input and OS determination. Still another implementation method for multiple processes or thread communication and synchronization is to utilize OS message queues e.g. the MICROSOFT Windows Message Queues. Windows Message Queues are the primary mechanism used for communication between modules of CHA system running on different threads, such as ChaSys and ChaHook. The synchronous mode of that mechanism, via a SendMessage( ) API, is also used for synchronized access to some shared resources within CHA without employing "MICROSOFT WINDOWS" specific synchronization objects such as critical sections or mutexes. Windows Message Queue is also used for communication between modules running on the same thread, for example, ChaSys and IVM, for effective separation of the modules as well as easier implementation on platforms other than MS Windows.

As the CHA System's Expression Engine, the IVM Class includes a number of public and private functions that service the expression, which may involve any number of events, from one event to N events. The inner workings of this engine are very extensive and cover a very broad range of applications. Essentially a multitasking language and processor, the IVM provides the backbone of all multimedia services from simple GuiObj interface highlights to independent, complex, full featured interactive applications. Access to the very powerful multimedia services is handled by several categories of interfaces as follows: System, Control, Status, Media Services, Messaging, Networking, and input/output.

The System interface includes, among others, the following functions:
  Initialize, Start, Pause, ShutDown, Resume;
  the Control interface includes the following functions:
  Synch Operations, AcknowledgeReceiptMsg, Notify, CurrentValue;
  the Media Services interface includes the following functions:
  Task Controls, Proceed, SendVars, ReceiveVars, OnReceipt, PlaySequence, CreateTask, KillTask, KillGroupTask, CreateGroupTask, RefreshBackground; and
  the I/O interface includes the following functions:
  FileRequest, FileLoaded, FileReady, FileStartReceiving, FileBlockStatus.

The Host App Model provides a fundamental data set for functions and tools to provide many automated operations for dynamic or automated ICAP and Guide Sequence construction. The Host App Model includes a structure that represents every GuiObj in the Host Application stored within structured, hierarchical and graph formations. The Host App Model also includes data structures and link information that reflect the entire user interface of the Host Application as well as GuiObj details and interface groups and their behaviors and relationships. While the Host App GuiObj records have all instances and different categories of GuiObjs and their states for the Guide Sequence Set or functionality, a Link Set of the Host App Model also helps track the state of the Host Application and stores all description of the interconnection between the GuiObjs. By using heuristics on the Host App Model's data and descriptions, many syllogistic, searching, predictive, and locating operations can be executed to create inference or deductive behaviors in conjunction with the user's actions within the physical interface for a Host Application.

One of the functions of the Host App Model is to facilitate rapid access to perform construction and real-time assembly of CHA Fixed and Dynamic Guide Sequences during the Host App program session. Such real time assembly of sequences differs from known assistance systems, since known assistance systems instead embed hard coded scripts into a help application. Real-time assembly and Guide Sequence generation facilitates a much more dynamic interaction with an application such as performed and experienced in the CHA System's Explore Mode. Dynamic path finding functions can find alternate routes to reach a destination, and parameters such as controlling the number of steps needed to reach a destination i.e. particular GuiObj, estimated data size, etc. are also input. The path finding functions then calculate the route through the Host App Model's database. Encoded structures can be embedded into the database to "weight" certain pathways over others to further control the heuristic engines.

The Host App Model structure also provides a platform to perform analysis for CHA Monitoring operations such as contextual Inference Processing utilizing the CHA Inference Engine. Via natural language or list processing, if some intent is communicated to the CHA System such as a more specific target or general description such as font controls in a word processor, the CHA System's Inference Processor can suggest subsequent or alternate actions. The user may be prompted for such intent Alternatively, if the process is automatic without prompting the user for an indicated intent, the CHA Monitoring mechanism can also attempt to present alternatives based purely on calculations performed by the Inference Engine in collaboration with the Host App Model.

The user's intent can also be input through an Assistance Topic which describes the identification, classification or categorization of a given Target GuiObj Action Set and processes to an associated lookup key. For example, a Target GuiObj Action Set may include using a "Tab" button control in a word processing program in which various tab related controls reside in different locations in the Host App's interface.

Another application of the Host App Model is to assist the automatic construction of ICAP commands. With an ICAP command, to change one or more Host App parameters e.g. set by a checkbox control in a dialog box, the CHA ICAP automatically executes a series of program actions without requiring any user interaction. This is accomplished with CHA Mapping functions in which GuiObj Paths through the Interface Hierarchy can be mapped to actual "physical" controls in the application. Similarly, a user's interaction with a physical control in the application can map to the logical representation of that same control i.e. the GuiObj within the Host App Model.

The CHA's Host App Model and associated Assistance files can be built either during the development of the Host Application with general access to the Host Application's internal source code files, or after completion of development of the Host Application. In the case of post-completion access, a third-party developer can develop the CHA Assistance system and method after the commercial or internal company release of a product or application. This independence permits third-party development for Host Application support in very specific areas of the application without requiring access to the Host App's original source code or libraries. With the publication of the specifications of the Host App Model, third-party developers are able to develop their own equivalent CHA Systems.

The CHA System's ChaDB file set is the primary data and code storage area for CHA Assistance support and execution of Fixed and Dynamic Guide Sequences and auto generated ICAP Procedures. The ChaDB file set consists mainly of the following set declarations:

Host App ChaDB=Host App Model+Host App Model Resources+Host App Assistance Set;
Host App Model=GuiObj Set+GuiObj Link Set;
Host App Model Resources=Commentary Library+Behavior Library+Miscellaneous Libraries;
Host App Assistance Set=Assistance InfoObj Set+Assistance Script Set+User Custom Data.
GuiObj Set: persistent representations of all interface objects in the Host Application
GuiObj Link Set: all link information between all GuiObjs
Commentary Library: component material for assembling commentary that is interleaved into Guide Sequences.
Behavior Library: a set of available behaviors described in Script/language Opcodes that refer to the environment resources that defines a controlled set of interactive operations with the Host Application and CHA events. This permits the substitution of data elements and the reuse of Behavior code without the need for reprogramming to produce new Assistance Sets.
Miscellaneous Libraries: contains shared resources or code for various general purpose functions.
Assistance InfoObj Set: the essential information in any CHA compatible format that is used in Guide Sequences.
Assistance Script Set: script or language opcodes that describe Fixed Guide Sequence events
User Custom Data: holds user customized data in any format to allow personalization of CHA applications.

In general the database is organized using a graph structure. While there exist hierarchical forms and groups of GuiObjs that reflect a typical Host Application's natural internal organization, there are, in addition, links between GuiObjs that allow closer connections along strategic navigational pathways e.g. returning to a root position. Connectivity algorithms enable shortest path routes to be determined. Additionally a graph structure provides multiple Relational Views from the same database necessary for the different functionality. For example, one view may reflect the hierarchical structure of a Host Application's interface. Another view may reflect the operating system's organization, while another view may be navigational, etc.

Figure 9:
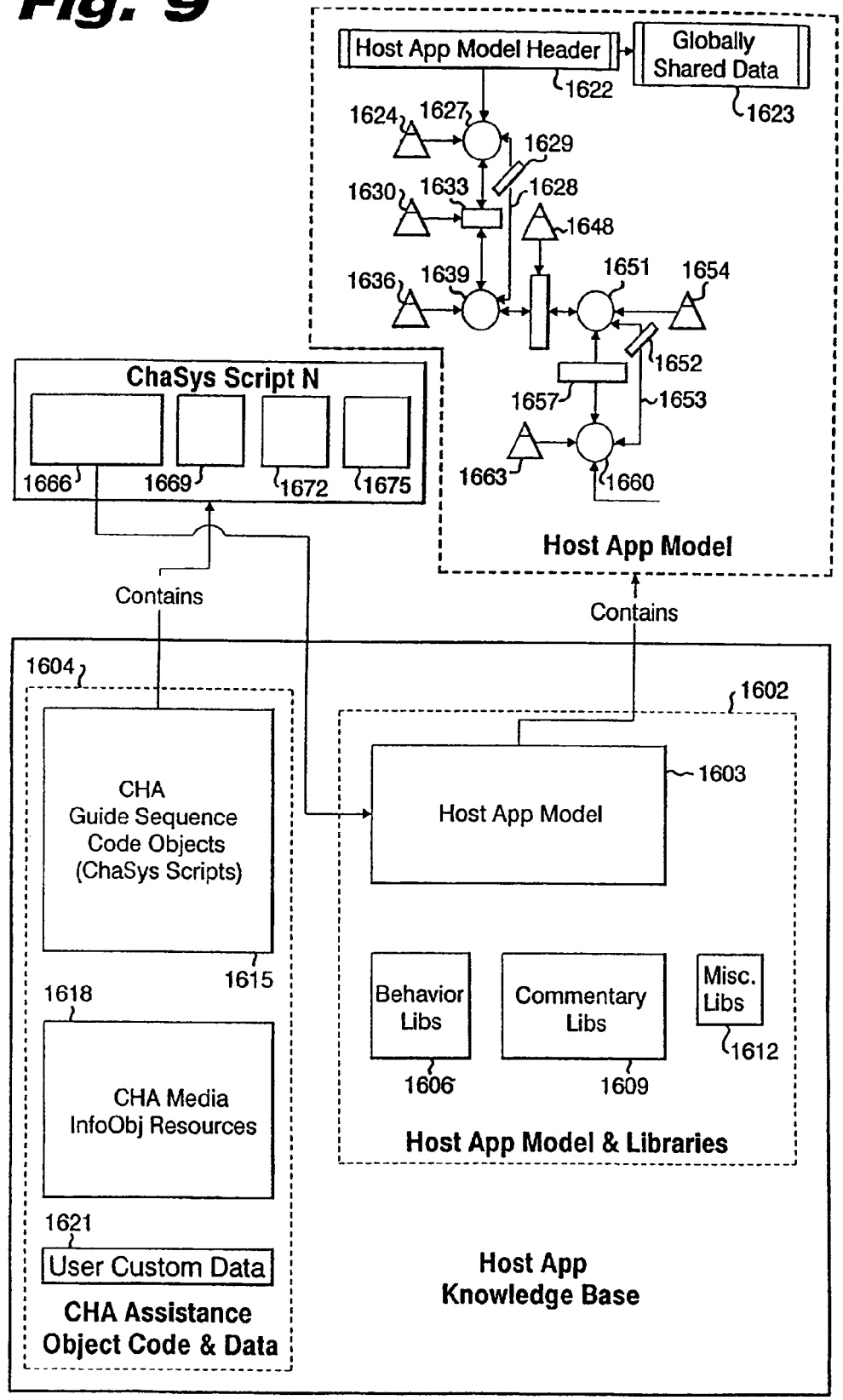
FIG. 9 illustrates a CHA Database (ChaDB)

Referring to FIG. 9, a chart is illustrated which describes the major data partitions of the CHA Database. The Host App's CHA Database (ChaDB) is divided into two major divisions: the Host App Model and Libraries 1602 and the Assistance Object Code and Data 1604. The Host App Model and Libraries include the Host App Model 1603 and several auxiliary libraries, such as a Behavior library 1606, a Commentary library 1609, and Miscellaneous Libraries 1612.

Each of the libraries represents shared data or code which provide a set of resources which can be referenced by the Assistance Objects Code or which can be processed during run-time to produce combinations or permutations of results that can be packaged and accessed by the CHA system during run-time to assemble Guide Sequence Elements. The Assistance Objects represent CHA application content which include both code 1615 and resource data elements 1618. Additionally there is a User Custom Data Set 1621 which includes user-inputted, customized data.

FIG. 9 also illustrates a ChaSys Script object, including components 1666-1675, and additionally, the Host App Model including components 1622-1663. The ChaSys Script N object includes elements representing the code 1666 and data 1669-1675. As shown in FIG. 9, the code and data represent the code references to the global Behavior Library 1606 which includes code descriptions of generic behaviors for prescribed GuiObj interface configurations and environments. The data elements of the Script structure are referenced to areas of the Media InfoObj Resources 1618 or User Custom Data 1621.

The Media InfoObj Resources are further subdivided into multiple Detail Levels for access at different levels of information from summary information to detailed information. The Host App Model is represented as a graph structure including GuiObjs 1627, 1639, 1651, and 1660 which are indirectly linked together by GuiObj Link Structures 1633, 1645, and 1657. Furthermore, individualized InfoObjs 1624, 1630, 1636, 1648, 1654, and 1663 are connected to all of the GuiObj and Link structures.

Figure 10:
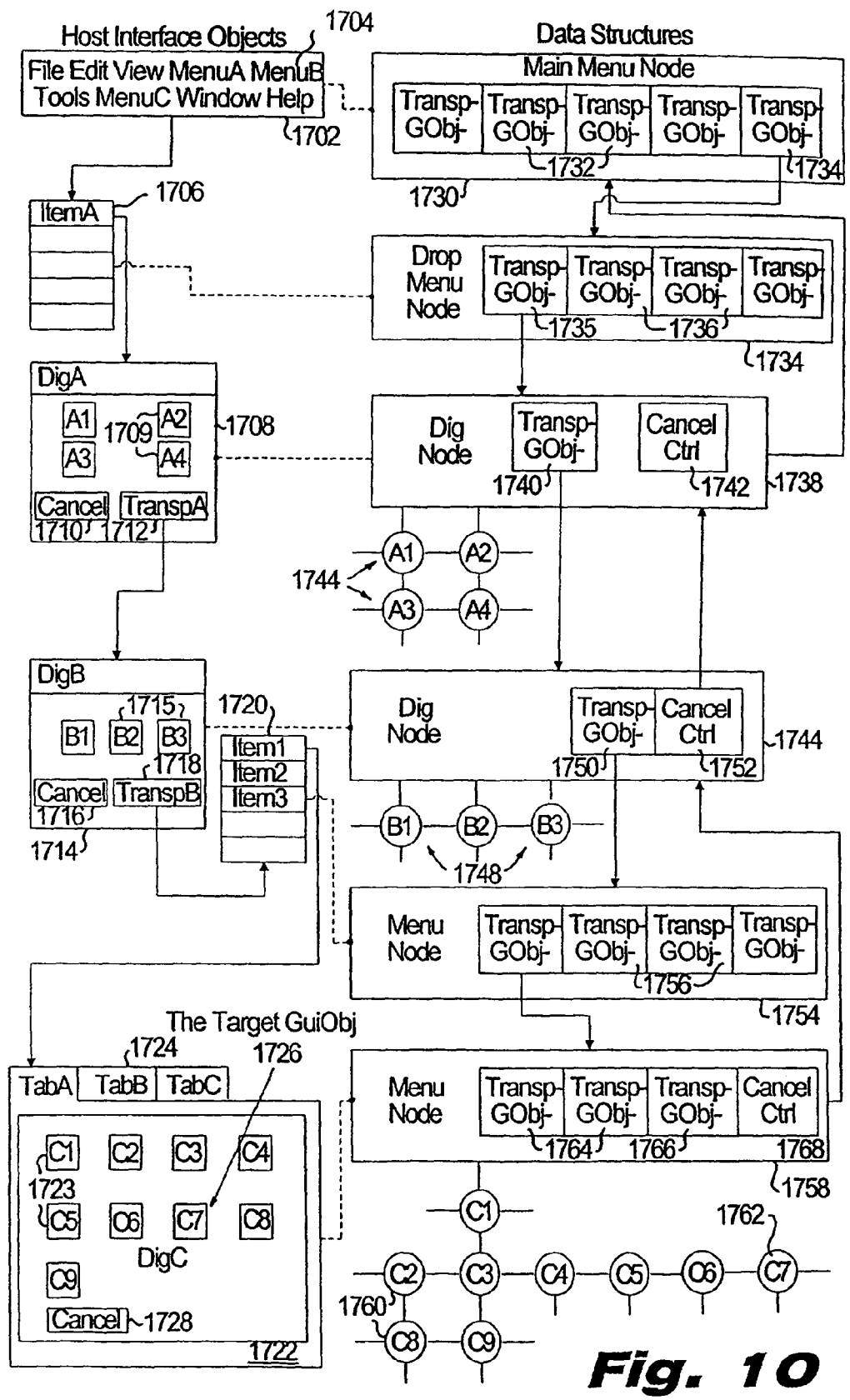
FIG. 10 illustrate Host Interface GUI Objects and Data Structures.

There are many possible views of the data and the infrastructure of a Host Application's interface. One illustrative embodiment is shown in FIG. 10, which shows the ability of the CHA system and method to traverse any GuiObj Path. As shown in FIG. 10, an example of a series of user steps through a GUI style program interface is shown which navigates through a mixture of menus, menu items, and dialog boxes to reach a Target GuiObj 1726. Beginning at the general default state of the Host Application which normally is at its main window with access to the current loaded file being edited, the location 1702 has a group of Menu "heading". When a Menu heading is actuated with a pointing device or other input devices, such as the MenuB selection 1704, the CHA system invokes a group of menu items as shown in the menu list 1706. The user GuiObj itemA in turn invokes the dialog box DlgA 1708 which includes numerous other GuiObjs, of which the Cancel 1710 and TranspA 1712 GuiObjs are designated as Transport GuiObjs.

In this context, a Transport GuiObj is a type of GuiObj that navigates the user from one GuiObj Set to another GuiObj Set, with a group of GuiObjs including a particular GuiObj Set, such as Dialog Box A (DlgA) 1708 and Dialog Box B (DlgB) 1714. Transport GuiObjs are used to navigate through the application. Note that in a simulated mode of operation, Highlights are shown for the relevant controls that could execute the goal task but are not actually activated. This simulation mode may be used for situations in which one wishes to show the user where the needed controls are located but does not want to tamper with the user's environment.

Each GuiObj Set is part of the Host Application state in the context of the target application, which a user navigates from one dialog box to another, which may be referred to as having the user move from one Host Program state to another Host Program state. The button interfaces 1709 and also in the remaining dialog boxes 1715 and 1723 are additional GuiObjs in different categories and different Host Application states.

In a subsequent step, the user actuates the TranspB choice 1718, which invokes the group of menu items Item1, Item2, Item3, etc. which is another GUI GuiObj type. Clicking on Item1 in turn brings up the next dialog box 1722 which has a slightly different style in the dialog box 1722, and is grouped with other dialog boxes that are accessed via Tab GuiObjs 1724. From the dialog box 1722, the button C7 1726, which is a Parameter GuiObj type, sets a single parameter and affects the Host Application program's persistent internal data settings which in turn applies to the process of calculation or display and functionality. The Cancel Buttons 1710, 1716, 1728 alter the Host App's state from the current set of GuiObjs to the previous state until the program once more reaches its general default condition 1702 where editing or processing access is again available to perform operations on the current file data. This default condition is also referred to as the Main Ref State.

There are several types of GuiObj data structures shown in FIG. 10, such as Nodes, Transport, Cancel, and Parameter Selection. As shown in this example, a series of GUI interfaces of a specific type are provided, such as Menus 1702, Menu Items 1706, Tabs 1724, and Dialog Boxes 1708. There exist an endless variety of combinations of the many different types of GuiObjs. Many other combinations using many different types of GuiObjs are possible. The principles described, however, are the same for any of the many GuiObj types as related to the disclosed CHA system and method.

The Main Menu GuiObj Node 1730 describes and includes data relevant to each of the Main Menu items, and the data structures of FIG. 10 illustrate a high level conduit network between all Host Application states and between all navigational departure and destination points. Each Transport GuiObj data structure 1732, 1734 includes relevant linking information to other peer Transport GuiObjs as well as a single link to another GuiObj Group corresponding to a GUI object such as a dialog box or menu group.

Every GuiObj Node has a key value determined during the CHA development phase and Host App analysis using the Guidance Development Tool Set. The key value is used to help locate a particular Node data record. The next Node includes data for the GuiObjSet which is a DropDown Menu 1706. Although the GuiObjSet includes a set of Transport GuiObjs to link to child structures below itself, the GuiObj Set does not include a Cancel structure because the behavior of a DropDown Menu is to disappear when a user releases the left mouse button, or an equivalent actuating action, and hence pointers bypass this record when moving up the record hierarchy.

The structure 1738 is the first Dialog Box encountered by the user in this example and includes a set of structures 1744 associated with additional user GuiObjs included in the Dialog Box. As the Target GuiObj 1726 and its associative data structure 1762 is the goal, structures 1738 are skipped. The current Transport GuiObj 1740 leads to the next Node structure which is another Dialog Box which also includes its own Parameter GuiObjs 1748. Links continue through at least one additional DropMenu structure 1754 until finally arriving to the Dialog Box which contains the Target GuiObj 1762 found in the dialog's GuiObj structures 1760.

Every GuiObj can have an associated InfoObj which includes all data that presents some form of information in any of a variety of formats. The goals of the data InfoObj Data Structure are to facilitate rapid access, data integrity, and ease of maintenance, and also to provide a facility or tool for performing InfoObj Detail Level assembly or retrieval. InfoObj Detail Levels are ranges of detail that can be associated with different categories and groupings of GuiObjs. One category is the Group Level which contain summaries for groups of controls such as those controls included in a dialog box. Another category is the Control Level which reveals specific information about a control e.g. a checkbox, what the control does and what the control controls. Another category is the Topic Summary Level which includes summary information for a general category e.g. formatting. Furthermore, the InfoObj Detail Level (IODL) facilitates further divisions of detail determined by the CHA developer, which ranges from high level, summary to deeper specifics. Data structures related to IODL facilitates runtime processing and selection of appropriate InfoObj records. Special Notes include miscellaneous prominent points about GuiObj controls contexts or specific tips, etc.

Figure 11:
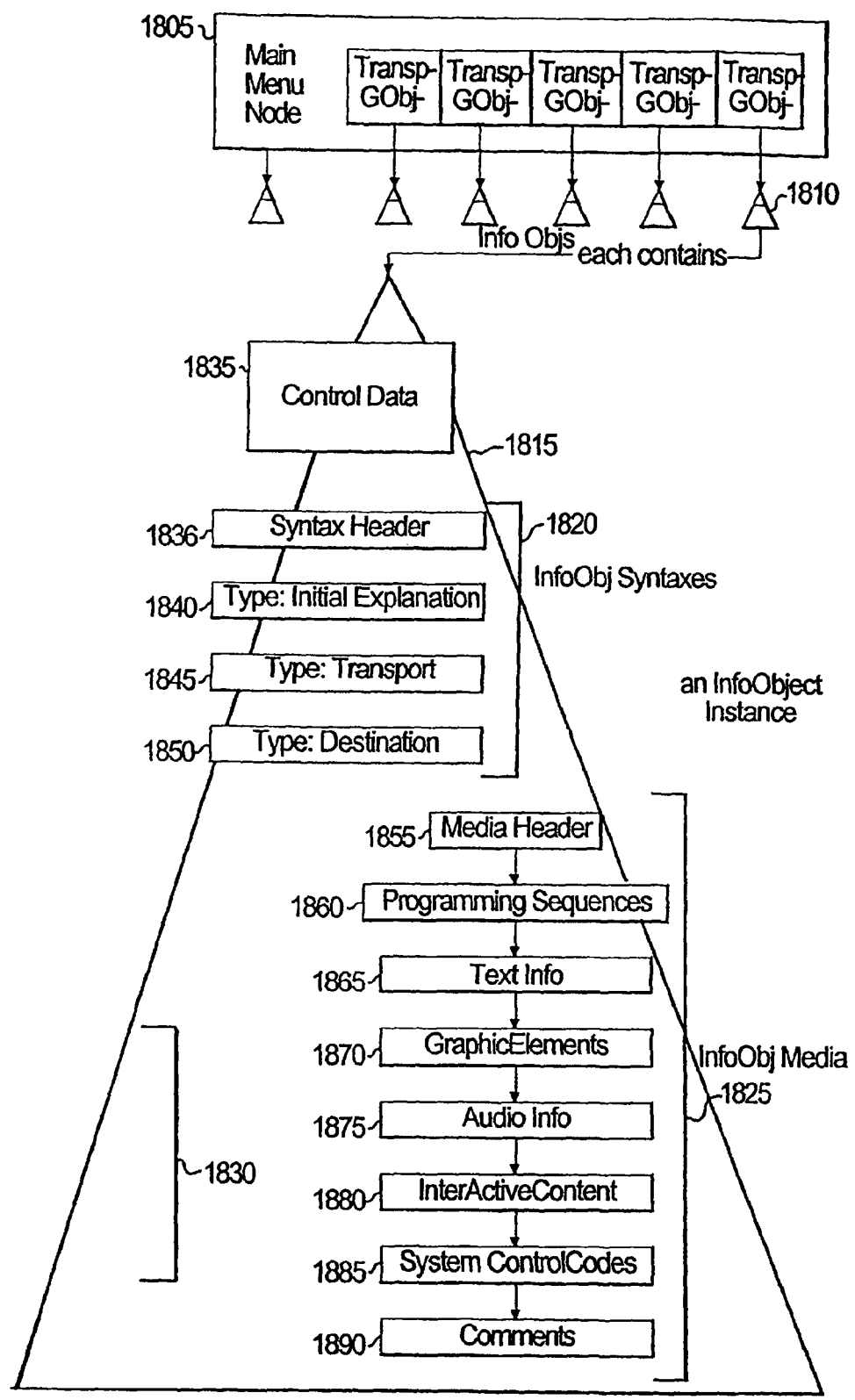
FIG. 11 illustrates InfoObj Data Structures.

With reference to the Node structures shown in FIG. 10, such as structure 1730, FIG. 11 is a detailed illustration of a Main Menu Node's associative structures 1805 in which each Transport GuiObj's attached InfoObj 1810 is further expanded into the sub-structures contained in 1815. The Control Data 1835 enumerates internal InfoObj details, such as metrics and relative sizes, offsets, pointers to external records, and other control information about its linked category structures, such as: InfoObj Syntaxes 1820, Sequence Media 1825, and Expansion 1830. The Syntaxes category may contain records related to the InfoObj Detail Level parameter that influences run-time record selection in Dynamic Guide Sequences: Initial Explanation which associates via pointers, summary or high level content describing the associated GuiObj; Transport which associates via pointers, content attached to Transport GuiObj types to provide traversal through the Host App's interface hierarchy; and Destination which associates via pointers, content describing a Target GuiObj, with all Host App parameter changing GuiObj controls could have Destination content record to facilitate satisfactory Dynamic Guide Sequence generation that expresses the conclusion of a series of SeqSteps.

The InfoObj Media category may contain records of different media types: Programming Sequences which is code that can program sets of events that can be referenced externally to promote modular design structure, which may be related to Expression Engine execution or to ChaSys code references; Text Info which is any graphical expression of text in static or animated form; GraphicElements which is any pictorial representation static or animated rendered by the Expression Engine; Audio Info which is any digitized or control information related to aural mechanisms; InterActiveContent which is any format used by an Expression Engine, as exemplified in the CHA Activity in FIG. 6, which enables full interactive behavior e.g. the control of a multitude of animated objects with a pointing device; System ControlCodes which is additional control information to facilitate efficient interface and operation by CHA engine subsystems; Comments which is a data record to store user custom information that is related to the previously described data structures. The last category depicted i.e. Expansion 1830, is a mechanism for expanding existing CHA data files without disturbing legacy data sets. Note that in terms of the kind of relationships between the categories, each instance contained in the Syntax category may have 1 or more associated instances contained in the Media category to support the Detail Level. The GuiObj records within the Host Application Model have pointers connected to InfoObjs of many different data types in different formats for a wide variety of expressions from text to static graphics to animated or interactive applications.

Referring again to FIG. 10, for an example of an application of this Host App Model, consider the problem of Path Tracing through the model to find routes between GuiObjs and the subsequent automatic generation of a Guide Sequence.

In this Path Tracing mode, initialization includes the defining of a Start Point, which could be the Main Ref State or alternately, a different starting GuiObj location selected by the user via a displayed symbolic representation of the Host App Model. The CHA system and method then fetches a Behavior Script from the Behavior Library, or otherwise generates an appropriate behavior script, and then retrieves the initial data from the Host App Model. The user may interact with the actual Host Application and locate a specific target by placing the cursor over the Target GuiObj. As the user confirms with an action the Target GuiObj, operating system data is extracted and stored i.e. as a Target GuiObj Structure. The extracted internal OS data is converted to a key value which is sent to the Host App Model Processor 2040 shown in FIG. 12 at which cFindGuiObj or cFindPath functions may be executed. The user may also click on the exit Path Trace control, and traversal of the Host App Model ends.

Before proceeding the user can select one of the following settings for the interaction functions of the CHA system and method: a Verbose Flag or Disable Verbose Flag, and a InfoObj Detail Level value. These settings determine the levels of associative information via InfoObjs that are presented and interleaved during the generated Paths.

Continuing, to perform a Path Trace Phase, the CHA system and method start from a Target GuiObj location, and traverses back through the hierarchy of GuiObjs to locate the Start Point. Each Transport GuiObj Struct is then stored in a buffer as each Transport GuiObj Struct is located, and each instance of such Transport GuiObj Structs is tracked; that is, a SeqStep structure, index, and set up links are defined between each SeqStep. Starting with the Target GuiObj, within the current Node Structure, the Path Trace Mechanism locates the immediate parent or parents of the Target GuiObj. Note that the term "parent" refers to the parent/child relationship which suggests the containment of one i.e. the child by another i.e. the parent. A child may have multiple parents and a parent multiple children. The many possible interconnections are a reflection of the Host Application to efficiently and accurately reflect the application's structure. Continuing, if there is more than one parent, for each parent N, the paths are traced until the Start Point is found. If only a single parent is involved, the Path Trace Mechanism resumes by locating the new node and locating its parent, and the traces are continued until a Start Point is verified.

If no Start Point is found on the current route, the CHA system and method pick up the Nth parent alternate route, and repeat the processing until a Start Point is located or inferred as an option i.e. the Host App's Main Ref State. If not located, then the CHA system displays an error message and resets. The various GuiObjs have attached InfoObjs that can be retrieved during Guide Sequence execution at different Levels of Detail determined by parameters set earlier. The CHA system also may refer to the Behavior Script or generates Input Scripts as needed, and extracts script fragments and inserts the fragments into the SeqExecBuffer. Note that the SeqExecBuffer is a major "collection" buffer that in both Fixed and Dynamic Guide Sequence preparation assembles all required code and data elements prior to execution of one or more Guide Sequence steps (SeqStep). Behavior Scripts provide executable OpCodes that are pre compiled or compiled at run time, and are designed for different window configurations and environments to provide various Guide Sequence Behaviors.

For each SeqStep generated in the Path Tracing Phase, the CHA system and method insert into the SeqExecBuffer at least one of a Script Instance, a Commentary Instance, InfoObj Instance, and a Highlight Instance. A Script Instance is a Script code or its equivalent Opcode Set that is executable by the ChaSys Processor along with pointer references to data resources or their equivalent. The series of SeqSteps i.e. the Dynamic Guide Sequence is passed into the Sequence Processor Modules to complete execution.

As explained previously, a Sequence is a term used to describe the sequential, step-by-step presentation of information via InfoObjs synchronized with the user's interactions with a Host App's GuiObjs. GuiObjs can be controlled by the user or by a CHA process using its own independently generated schedule of events in which the user is prompted to act or provide information. A Sequence includes N SeqSteps in which each SeqStep has zero or more associated InfoObjs or defines the interaction with one or more Host App GuiObjs. As previously mentioned, InfoObjs have various presentation forms ranging from static or animated graphics to static or animated text. The SeqStep may have associated InfoObjs that are presented in different expression forms synchronized with user input and GuiObj related CHA Events and additionally, the GuiObj's highlighting mechanism may be animated, static, or associated with special graphical effects.

A possible user experience with a Guide Sequence may involve the situation in which the user, after reading the text and graphic or listening to an audio description from an InfoObj instance, actuates a CHA interface item e.g. a button or icon which launches the Guide Sequence. A display status message appears, followed by CHA processing which loads the first targeted section of the Host App's GuiObjs Interface that the user may monitor and follow. Upon the loading of the Host Web Page or Application GuiObjs, the targeted interface elements on the Host App are highlighted and InfoObjs; that is, messages or interactive elements, are displayed. The user can further interact either with the Host App directly or with different CHA controls such as Next, Back, or Random-Jump-To-SeqStep controls. Additional SeqSteps are processed until the current Guide Sequence is completed or aborted. In the latter case the appropriate status message is displayed and all input control on the Host Application can return to the Host Application unless another sequence is selected from the Search Tool or some other method of invocation.

Sequences exist in two principal categories: Fixed or Dynamic. A Fixed sequence has the basic GuiObj Path which is predetermined, and combines data prepared during the CHA development process prior to the interaction with the Host App session. A Dynamic sequence does not have a predetermined GuiObj Path, but instead the GuiObj is selected on demand via user actions and subsequently derived from the Host App Model and its heuristics. In both Fixed and Dynamic cases many different elements belonging to the Guide Sequence can be actually assembled or constructed during sequence processing in new combinations that are unknown during the time the sequence was developed. In other words many elements such as Commentary i.e. language phrases expressed from the CHA System, or different combinations of InfoObj Detail Levels are combined during user actions or requests during the session with the Host Application. In general a Fixed Guide Sequence allows for fixed paths and exception processing for creating finely tuned sequences but may still use just-in-time generated elements as well.

A Dynamic Guide Sequence is suitable for rapid access and/or production where the output product quality is enhanced by the heuristics of the various element assembly engines provided for the different data types e.g. Commentary or InfoObjs, with the InfoObjs having parameter Detail Level controls. Both Fixed and Dynamic Sequences have their place in the CHA System's ability to provide a broad range of assistance quality for different solution contexts.

The CHA System allows for both these Fixed and Dynamic categories to operate in the same session or environment in which Guide Sequences are either assembled at run-time or are prepared before run-time, and the Guide Sequences include all relevant InfoObjs to convey information and guidance to the user. The CHA System also permits the switching between Fixed and Dynamic operational modes on demand. For all of the preceding, although processing for a single application may be primarily performed, multiple applications can also be controlled and coordinated in the CHA System.

Figure 12:
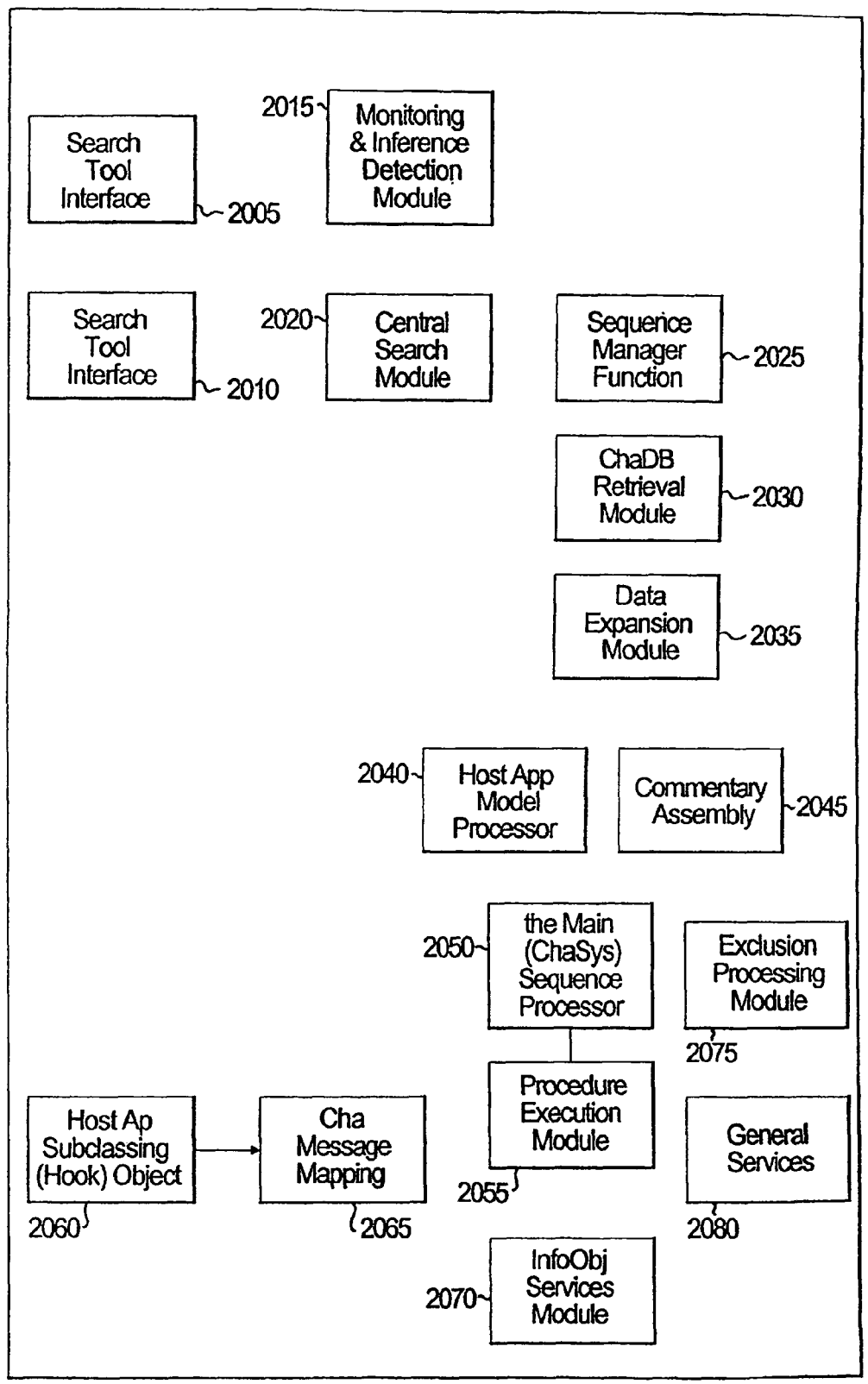
FIG. 12 illustrates Guide Sequence Processing Modules.

FIG. 12 illustrates a set of modules that process CHA Guide Sequences. Items 2005, 2010, and 2015 are possible search tool interfaces that in turn invoke processes leading to specific information or access to one or more Guide Sequences. In this assistance mode, the illustrated search tool interfaces enable the invocation of one or more Guide Sequences. Such tools could employ known techniques in the art such as voice control input, standard GUI interfaces, natural language parsing or inference engines that map user input descriptions, actions or selections to specific output i.e. a CHA Sequence, code instruction sets and other types of CHA data forms. The Central Search Module 2020 employs various methods to perform a search technique within or by the selected search tool to perform the lookup function for retrieving specific Sequence instances.

Depending on the search tool interface or the mechanism selected, one or a combination of detection and selection techniques are enabled and used to process and narrow the user input to perform assistance retrieval. The data set being searched includes prepared assistance data and optionally custom data created by the user via one of the CHA System procedures such as ICAP. Another configuration and interface technique for locating an assistance instance includes using the Monitoring and Inference Module 2015 to accommodate the analysis of the user's actions to make automated inference of the interaction with the Host Application. Once detecting specific actions, the derived description or keys determined through the analysis are used as input to the Central Search Module 2020 that invokes the lookup function in the existing ChaDB data set.

The Sequence Manager Function 2025 is a function that manages the count and termination of N retrieved or processed Sequences. The ChaDB Retrieval Module 2030 performs all data record retrieval from the ChaDB data set which includes all necessary components such as the Host App Model, the InfoObj Set, the Commentary Data Set, User Custom data, CHA Guide Sequence Script code, etc. Depending on the Host Application environment, this module also performs data caching, the starting of asynchronous loading processes, or compression before transmission, or conversely, the compression of data on receipt from a remote location.

The Data Expansion Module 2035 converts data from its compact storage and optionally from a compressed form into the expanded CHA run time format. The Host App Model Processor Module 2040 handles lookup and concurrent navigation/retrieval and instant construction of InfoObj data components. The Commentary Assembly Module 2045 does rapid sentence and phrase construction for non-essential data type such as presenting various comments as the user interacts with the Host Application. These features of the Commentary Assembly Module 2045 permit the CHA system and method to create a less repetitive, more dynamic personality for the Guide Character. Guide Sequence processing also uses the Main Sequence Processor 2050 which synchronizes, coordinates and manages different processes and sub-processes for Guide Sequence Script commands. Module 2050 contains the ChaSys component which plays an important role in coordinating activity and communication between different concurrent tasks and processes.

The Procedure Execution Module (PEM), in cooperation and communication with the Main Sequence Processor, parses all data structures and types in the SeqExecBuffer and launches or routes them to the appropriate service inputs such as in the InfoObject Services Module. The PEM also includes the function cStoreExecBuff which parses prepared output from different modules and stores instances of the output data records into the SeqExecBuffer. Furthermore, the processing of these various data types can be performed asynchronously depending on the requirements of the environment, such as in a networked environment with slow data transfer rates.

Both the Host App Subclassing Object 2060 and the CHA Message Mapping 2065 are modules, also described with reference to components 1415, 1418, & 1421 in FIG. 7. Such modules 2060, 2065 handle the interception of Host Application operating system messages and the filtering and mapping to CHA Events which are then passed to the Main Sequence Processor 2050 to coordinate and synchronize user input actions on the Host Application with internal processes and sub-processes being managed for the presentation of InfoObjs. The expression and manifestation of these InfoObjs are handled by the InfoObject Services Module 2070 which selects the appropriate expression engine for the input data types. The appropriate rendering function processes its native data type to manifest aurally or visually the InfoObjs to the user. Furthermore, the InfoObj Services Module is a framework for embedding different types of InfoObj or Expression services which can be enabled depending on different configurations of environments. For example, the IVM class can be substituted with a different expression engine or perhaps a different rendering mechanism such as a text mark-up language similar to HTML. The Exclusion Processing Module 2075 evaluates exceptions such as incorrect user actions and routes messaging to appropriate subsystems to construct and select appropriate responses handled by the Expression services. The General Services Module 2080 handles all text, static and animated graphics and aural expressions for all non InfoObj services such as GuiObj highlighting and overlays, the Guide Character, Commentary objects, etc.

Figure 13:
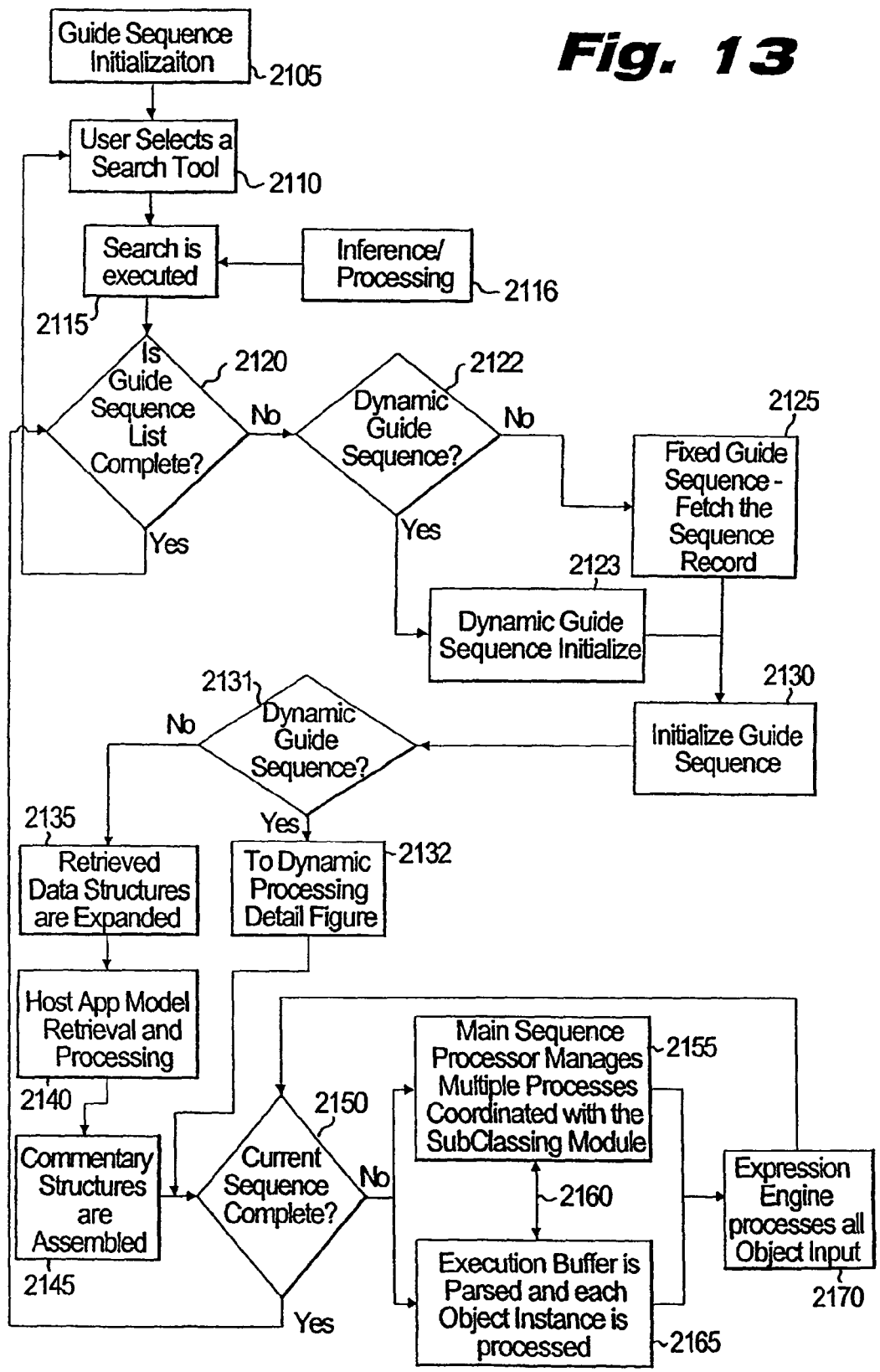
FIG. 13 illustrates Dynamic and Fixed Guide Sequence Processing.

Referring to FIG. 13, during Guide Sequence Initialization 2105, the run-time Modules are loaded into memory, such as random access memory (RAM). The run-time Modules are then launched, and a primary Host Application is selected. The "primary" descriptor refers to the designation of a leading i.e. primary application within a group of applications in which actions are initialized and managed. Eventually after a number of SeqSteps, processing may return to the Primary Application. For example, a web browser presents to the user an interface for an information set and is the primary launch point for a series of actions on one or more client applications on the user's computer and is also a potential point of return when all SeqSteps are completed. Another example is when the user begins a sequence of operations on a local client application i.e. Host Application, chooses to manipulate settings in their local operating system e.g. the "MICROSOFT WINDOWS" Control Panel to change a system setting, and then returns to the starting application. The primary application setting is dynamic and can be changed after initial processing, if required.

During this Initialization stage, the CHA Host App ChaDB or multiple ChaDB files are set up for processing, and links are established with the CHA Run Time Modules to properly locate needed run-time data. This group of multiple applications are called the CHA Application Set, which represent all applications being controlled and monitored in relation to the Assistance Data Set provided. This accommodates typical modern multiprocessing, multitasking operating systems which permit the concurrent running of numerous applications. The CHA System can operate and coordinate actions as well as processes across multiple applications.

The pointer to the current ChaDB, which had been initialized during the application selection phase performed at the Initialization stage 2105, as well as a pointer to the ChaDB local index inside ChaDB, are found. The local index permits all internal ChaDB operations to execute to retrieve the targeted Guide Sequence using the Assistance Item Key. The Assistance Item Key value is an identifier used to locate an Assistance record which includes a header and set of pointers or functions that enables access to all relevant data for the given Guide Sequence. The ChaDB index operates in cooperation with the ChaDB Retrieval Module 2030, shown in FIG. 12, required for setting up a mechanism to handle all resource management during processing of the Guide Sequence. This resource management is needed to track all code, InfoObjs or InfoObj elements to determine where the resources are located at any given time to schedule delivery. If marked as local, then a request is made to the input/output services to load the binary data, to decompress the binary data if necessary, and to pass it over to the calling function making the request. If not local, then request messages are sent to the Resource Locator to begin an asynchronous or semi-synchronous process to move data across different boundaries whether these boundaries are across applications or network connections of varying speeds.

There can be any number of searching tools or interfaces that map access of any number of Guide Assistance instances from which the user makes a selection or sets an option that transparently invokes a search method 2110. For example, a simple search tool interface may include a form to fill in text describing the topic of interest whereupon a database search is executed and results displayed in any combination of formats such as text, graphics, animations, or a set of Guide Sequence launch controls e.g. icons. The input text may be simple string searching or may be processed by a natural language parser to provide a user-friendly interface.

Another possible interface includes an Interface Map Tool which presents one or more hierarchical tree style views of the Host App interface, its principal GuiObj Groups and other secondary or multilevel interface objects in its hierarchical organization. Refer to the example shown in the ICAP Control Map illustration in FIG. 6A. Being a symbolic representation of the GUI interface of a Host Application, this representation may include, for example, a tree-structured structured 2D interactive map or a 3D version. This Interface Map tool provides an interactive interface for the user to select one or more GuiObj destinations which the CHA System can navigate or which executes a series of actions automatically. From this interface the located destinations are input to the CHA modules that can then dynamically lead the user through a path in the Host App and will process and reveal InfoObjs in proper context of the interface.

Furthermore, based on the disclosed CHA architecture, a tool may be provided for searching through all the application's interface's text labels to help locate a GuiObj control hidden in the interface amidst possibly hundreds of controls. For example, if a user is interested in all controls related to Tab operations in a complex word processor, searching for the string "tab" displays or leads to all locations where the Tab parameters could be modified.

The results of any of the interfaces mentioned above and subsequent Search 2115 is one or more returned Assistance Item Keys located in the database. Once the Assistance Item is located, a Guide Sequence's processing for a Sequence of a Fixed type occurs as follows.

The set of one or more Assistance Item Keys is passed to the Sequence Manager Module 2025, shown in FIG. 12, which sets up a pointer to the set and which initializes its pointers to the first input Guide Sequence Key structure. Since the search result may include, for example, N number of items depending on the search criteria, the Sequence Manager function counts and processes each item until the list is completed, in step 2120 upon which process flow returns to the Search Tool in step 2110. However if not complete, then a test is made for the presence of a Dynamic Guide Sequence in step 2122. If a Dynamic Guide Sequence is being processed, then its initialization takes place in step 2123, and continues on to Guide Sequence initialization in step 2130 into the procedures and steps common to Fixed and Dynamic Guide processing.

During the Dynamic Guide initialization, preparation is performed for later ChaSys Script Generation that produces an Opcode Stream, which is fed into the Main Sequence processor step. Here the output of the Search Tools i.e. GuiObj ID/Keyval is prepared for use in Dynamic functions that query ChaDB, in particular the Host App Model. This stage also serves as an entry point for the CHA Monitor Mode as described in FIGS. 15 and 15A, as well as for the CHA Explore mode. If a Fixed Guide Sequence is detected, then its Script record is retrieved in step 2125, and upon delivery of the Script record from the ChaDB, the fixed Guide Sequence Record, which gathers code and pointers to sequence related data, is stored into memory.

The Guide Sequence Initialization stage 2130 sets the state of all major structures by setting sequence processing state flags, by reading global options, and by setting global state flags, and step 2130 also sets the Destination Structure used for verification of Guide Sequence completion. The pointers to the current Host App Model for the Primary Host Application are also set. This stage may also include a cleanup process during which all pending operations from possible previous sequence execution, especially any pending subprocesses, are cleared and any operation flags are reset, and principal execution pointers are also set. For example, used for asynchronous processes between different subsystems, ChaSysQueue is cleared of any pending InfoObj data which is sent to InfoObj Services for processing, or alternatively such data may be cleared. If a previous Guide Sequence is still in the Queue, this previous Guide Sequence is cleared, or alternatively a prompt is sent to the user for user intervention to process, resume, or abort the sequence.

At step 2131 a test is made for Dynamic Sequence Generation and if yes, the Target GuiObj is passed onto Dynamic specific functions 2132. Refer to FIG. 14A and its accompanying description below for further details.

Continuing, it is determined if the CHA System is in Development mode. If so, the DevFlags Group is set. The DevFlags Group establishes the Development state for the CHA Run Time Modules and is a necessary component for the creation of new instances of CHA processes i.e. Sequences, Procedures, etc. with integration of all media data types for expression and InfoObjs, on a synchronized schedule coupled with user input event handling. ChaSys Processor module pointers and structures are initialized with the initial Sequence Step Structure (SeqStepStruct) which is a data structure containing all data for the Nth Guide Sequence Step. Additionally a call to routines in the Host App Subclassing Object enumerates any of the Host Application's currently open windows or interface controls, and fills in system details to SysGuiObj structures. Such details may include operating system internal structures such as window handles, window class names, and other information. The handles to the Host App's main window and its principal menu items or iconic toolbars of the OS's physical GuiObj exist and so act as launch mechanisms for later Guide Sequence processing. The ChaSys Processor is now ready to begin processing the first Sequence SeqStepStruct pending the preparation and arrival of the SeqStep required resources.

Once a record is completely loaded, or at least up to and including one completed Guide Sequence Step, the data expansion process begins 2135. Guide Sequence Steps allow for asynchronous operations in which a complete, logical portion of the data is loaded and is ready for processing. Subsequently, while one Step is being processed by the CHA engines and run-time components, other Steps can be requested and subsequently downloaded via the ChaDB Retrieval Module and I/O services. Capable of concurrent processing of numerous sub processes, the CHA System makes the downloading of multiple data sets of various sizes, transparent to the user in networked environments where data transfers rates are inhibiting. During the Expansion method in step 2135 in the Data Expansion Module 2035, different parts of the record are located, including the header which describes the type of data included in the record, and implicates pointers to its methods for expansion processing.

Decompression can take place immediately, or optionally can store the data in compressed form in memory for later decompression on-demand. Other files may also remain in storage or may be made ready for transmission from a remote location, depending on CHA System configuration options. All record data is transmitted and transformed to the appropriate memory blocks and corresponding pointers are established. Other procedures executed are pointer construction and the building of indexes to facilitate searches or the location of records.

One of the memory blocks includes the Guide Sequence and Sequence Resource data Sequence Resource data is either locatable via pointers, or embedded data can be included inside the script structures. Such pointers can also include references to existing Behavior Models found in ChaDB's contents, which greatly reduces the memory size of Guide Sequence Records. The Guide Sequence Record includes a mixture of several types, for example, InfoObj Data, User Custom Data, and Commentary or Expression Data, and may also include code to facilitate additional processing or to facilitate the assembly at different stages including responses to real-time analysis as a function of user actions or other calculations discovered only during user interactions. As the Guide Sequence script is processed via the Guide Seq Parser, tokens are extracted that map to language keyword operators.

The following is an example Guide Sequence Record for a fixed sequence:

| Guide Sequence Record | |
|---|---|
| Global Options | // for global processing |
| Header | // contains record ID indexes, inter record data |
| Commentary Process Modifiers | // modifies run time processing for commentary // generation |
| Weights | // statistical influences on generated or stochastic // operations |
| Generator Code | // optional, provides ability to generate opcodes // on the fly given a set of parameters determined // at run time |

| -continued | |
|---|---|
| Guide Sequence Record | |
| SeqStep1 Struct | // a Guide Sequence Step, usually defined by a User // action |
| Script Code | // opcodes or a script which is compiled into opcodes // that determines interactive behavior on the Host // Application |
| GuiObj ID | // reference identifier to a GuiObj in the Host App // interface |
| InfoObj | // essential information in any format supported // by the expression engine |
| Commentary Data | // non essential commentary that can be recombined // at run time |
| SeqStep2 Struct | // 2$^{nd}$ sequence step |
| Script Code | |
| InfoObj | |
| InfoObj | // specific format supported by the Expression |
| Graphic Animation | // Engine that supports rich, interactive animation |
| Commentary Data | |
| User Custom Data | // User entered data in a variety of formats for // individual customization |
| SeqStep3 Struct | // 3$^{rd}$ sequence step |
| Script Code | |
| GuiObj id | |
| InfoObj | |
| Commentary Data | |
| User Custom Data | |
| SeqStep4 Struct | // 4$^{th}$ sequence step |
| Script Code | |
| GuiObj ID | |
| InfoObj | |
| InfoObj | |
| Graphic Commentary Data | |
| ... | |
| SeqStepN Struct | // Nth sequence step |
| ... | |
| SeqTerminator Code | // ends the sequence |

The Sequence Script is subdivided into N partitions called SeqSteps which include a SeqStep structure usually, but not necessarily, corresponding to a Host App GuiObj which has an associated InfoObj ready for presentation with which the user interacts. Among other data, the SeqStep includes Host App state information that captures the state of the application at the time of creation of the Guide Sequence. For example, if a persistent GuiObj e.g. a checkbox was disabled during the time of the Guide Sequence creation, and the corresponding state information is stored into the Guide Sequence data structure S, and then, during execution of the same Guide Sequence the same checkbox is found to be enabled, then by checking the stored data structure S, the checkbox is enabled via mechanisms shared by CHA ICAP which simulates user interactions with the interface with a pointing device, to reproduce the target Sequence events and Host App's program states.

From the Sequence Script's current SeqStepStruct, the active structures are located and evaluated as either a GuiObj or an InfoObj. If the active structures involve a GuiObj, the GuiObj is set as CurrentGuiObj. In addition, a SeqStepStructs may include any number and any combination of GuiObj or InfoObj references. The subsequent loading and execution of Sequence SeqStepStructs are controlled either by a user action or by a scheduling mechanism which can be parameterized and which can use heuristics to construct choices in real-time. The parser detects numerous Guide Sequence Script operators typical in a script language such as conditional processing using IF, THEN, ELSE statements.

In addition, being a group of operators with a corresponding set of parameters, the Host App Model Interface Function set located in the Host App Model Processor module is used to provide programming interfaces for external functions that manipulate or read the Host App Model 2140. By using these interfaces, many operations can be executed using small input data especially to locate logical or virtual Graphic User Interface Objects (GuiObjs) and their relative position within the application's interface hierarchy. These GuiObjs and their properties are used as keys to facilitate operations from simple position lookup to inference and the construction of automated procedures such as ICAP.

One function of this programming interface group is the ability to enable the description of complex pathways in a very compact form and various operations on the Host Application Model. One such operation is handled by the function cFindGuiObj that receives, as an input parameter, a destination GuiObj Address of the Host App Model and then returns a pointer to a data structure record, which in turn points to details such as its ordinal position in the application hierarchy, points to pointers to its parent or other children GuiObjs, points to various attached InfoObj structures, points to pointers to User Custom Data, to Cyclic Redundancy Check (CRC) values for data verification, etc. In addition, another function cFindPath receives an input GuiObj destination and returns implicit details that can lead to the pathway to reach this destination as well as to retrieve various data structures from the Host App Model, such as InfoObj structures, along the same pathway. This function is also used in Dynamic Sequence processing. By using these functions that navigate the Host App Model, InfoObj structures attached to GuiObj records are also retrieved and with cStoreExecBuff, instances are created in the SeqExecBuffer for upcoming processing commencing beyond 2150.

The CHA system includes a mechanism to assemble optional Commentary objects in which the commentary represents a humanizing and optionally non-essential dialogue that is presented to the user either concurrently or sequentially as the user proceeds through Guide Sequence SeqSteps and interacts with Host Application GuiObjs. For example, if, during processing of the Guide Sequence, the directions as presented either through a character or text, or voice, etc. indicates for the user to press a GuiObj, after the user responds with a mouse click, keypress, or other actuating input or selection, the CHA System may respond with a simple exclamatory "Good!". The benefit of this mechanism is that such commentary provides feedback to the user and contributes to the leaning experience. The CHA System includes such a mechanism not only for providing such commentary, but also to create phrases and sentences dynamically to prevent the tedious repetition of phrases.

At step 2145, an assembly of commentary objects is performed by the Commentary Assembly Module 2045 that receives an input structure framework from the Host App Model Processor. The Commentary data set may include different target categories of fragments that are grammatically compatible and interchangeable according to a set of specific language rules. The Commentary Set may also include categories of phrases that are organized phrases that can be assembled in run-time into many different combinations to generate an extensive variety of phrases or expressions for the Guide Character, which is any animated character or other graphical representation interleaved with the presentation of InfoObjs. Commentary sentences and phrases can be created and rendered according to the selected data format, for example, by concatenating ASCII text or assembling sound fragments as in a playlist or files within the Expression Engine.

The CHA system and method uses, for example, several Commentary Categories: Non-Directed, Directed, and Transitional. The Non-Directed category includes comments which are not in reference to any particular interaction with a GuiObj or action by the user. On the other hand, the Directed category includes comments associated with a reference such as the user clicking on a specific GuiObj control. The Transitional category serves as a connective function presented by the Guide Character e.g. an animated character or group of characters. These commands can be performed at the start or finish of a Guide Sequence or may provide transition and natural cadences between Sequences or pauses during the Sequence.

Furthermore, the Commentary Categories may, in turn, be subdivided into different intentions, for example, to convey various moods, intonations, or expressions that generally attempt to assemble or build variety and character into the presentation. Assembling these phrases at run-time has the distinct advantage of reducing data production, and does not require the preparation of every possible phrase, and such assembling of phrases also contributes to the "personality" of the learning or interactive experience.

The following Commentary Categories may be Directed commentaries to specific GuiObj references or responses to action: Positive Humorous, Negative Humorous, Positive Encouraging, Negative But Encouraging, Positive Neutral, Negative Neutral, Positive Exclamatory, Negative Exclamatory, Positive Learned, Negative Learned, Next Step, Previous Step, Incremental Iterative Responses, and Different Moods from lethargic to energetic.

The Transitional category includes commentary associated with a State Transformation, with such Commands including: Stop Now, Start Now, Finished, About to Begin, Look For . . . , and Reminders or Tips.

The Non-Directed category have no particular reference, and may include commentary such as: Sarcastic, Verbose, and Humorous.

Each commentary may be interchangeable from a set of word or phrase choices to another within a category and sub-category.

Each Category is further divided into at least two parts: a Determinant Word Operator and a Phrase or Word Variable. The Commentary Assembly module 2045 locates a Determinant Word Operator (DWOp) and extracts an identification (ID) value which is passed to the Commentary Assembly module 2045 where a Phrase or Word Variable is filled in. A weighting system may be optionally implemented which affects the probability of word selection and so further adds an additional dimension to influencing phrase construction. Once Commentary data is prepared and stored in the Commentary output data buffer, the Commentary data stored in the SeqExecBuffer using a call to the function cStoreExecBuff located in the Procedure Execution Module 2055. The function cStoreExecBuff is called to create instances of the Commentary data in the SeqExecBuffer.

At this point in the Guide Sequence execution process, essential data elements have now been prepared, flags are set, and processing now begins in the Main Sequence Processor, using the component ChaSys. First a test is performed in step 2150 to see if the current Sequence is complete. If the current Sequence is determined to be complete, then the process proceeds to another test to determine if there are additional Sequences to handle. Depending on the search tools used in step 2110, some searches can result in multiple Sequences such as by searching for all Tab commands located in a plurality of locations in a word processor. If the current Sequence is incomplete, processing is directed to ChaSys which is part of the Main Sequence Module 2050.

ChaSys uses different synch objects, as well as known operating system mechanisms to coordinate the passage of data across different OS processes or threads. The ChaSys-Queue is used for managing asynchronous processes between different subsystems. When a request is made to a subsystem to process data, instances are created in the ChaSysQueue and packets of data are exchanged with different subsystems using, for example, the Hooking Function located in the Subclassing Object 2060, and also using the Expression Engine located in the InfoObj Services Module 2070.

Since processing in the Host App Model Processor 2040 retrieves from the Host App Model the designated Interface Pathways through the Host App's interface, SysGuiObj Initiation occurs for the mapping process between the referenced GuiObjs from the Host App Model to the SysGuiObj data provided by the operating system. A native operating system event occurs when any of the Host App's Windows are opened either by some CHA System automated process or by the user, and the Hooking Function 1415 detects the OS's window creation message e.g. WM_CREATE in "MICROSOFT WINDOWS". Additionally for existing windows, the CHA System contains an enumeration function that identifies all windows and controls which it can locate. In both cases i.e. for the creation of or for existing objs, attributes of the GuiObjs are extracted e.g. window handles, class names, etc., and stored in a transient storage structure (SysGuiObj) bound to a GuiObj. Double linked pointers are also set between the SysGuiObj and its corresponding, mirrored GuiObj in the Host App Model. By using these extracted GuiObj attributes, lookup keys, such as the GuiObj Key, are built and used to locate a corresponding record in the Host App Model.

Control of the Host Application's interface occurs using any CHA Mode Process such as the Guide Sequence Process or ICAP, and involves the automatic location and control of any Host Application GuiObj in a series of actions such as the actuation of a menu item, followed by the opening of a dialog box, the actuation of a button inside the same dialog box, etc. Such steps are accompanied by the presentation of InfoObjs synchronized with user GuiObj interactions. An internal operating system or procedure enabling data structures, such as window handles in "MICROSOFT WINDOWS", are made accessible for use by the Operating System and are needed to gain control of a given GuiObj. The choice of one or more GuiObjs is determined by scripts or real-time navigation through the Host App Model using symbolic interfaces or implied pathways resulting from deductions, heuristics, or calculations.

This enabling OS structure, which can be any of a number of types, depending on the OS and the application, allows control of the corresponding GuiObj along with access to certain object properties through the OS such as a window control's position, size, window style, class name, etc. The order and specific GuiObj, e.g. a button or icon, are all dictated or implied by the specific CHA data files from the particular Mode of Operation coupled with retrieval of Interface Pathways through the application's interface hierarchy in the fundamental Host App Model. To emulate the series of user-spawned application events, and to maintain guidance of the user through the Host App interface, it is therefore necessary to invoke, in a series, each targeted GuiObj via the operating system's mechanisms.

In this case, the CHA System opens each window or window control via part of the CHA ICAP Process when a windows message is generated and sent to the Target GuiObj via an Application Program Interface (API) call to a function similar to the "MICROSOFT WINDOWS" SendMessage function using the Target GuiObj's window handle. Once accessed and visible, the required operating system entities are then extracted and stored into SysGuiObj structures. Pointers are also set to their counterpart "mirrored" GuiObjs within the Host App Model framework. With SysGuiObjs in place, bi-directional communication occur between CHA Host App Model processes located in the Host App Model Processor 2040 and respective GuiObjs in the logical Host App Model's framework and objects in the live, Host Application's graphic interface.

As shown in FIG. 13, processes performed in steps 2155 and 2165 interact 2160 with the SeqExecBuffer. A parser routine identifies all data formats and tokens included in the buffer, and routes each identifiable entity to the proper input and eventually service routines. The triggering and response to various events, both internal and external to CHA, interact with time-based data types such as sound files, animations, and the presentation of information. For example, a pictorial character is displayed on a screen and messages, either audio and/or visual, are output to the user describing a GuiObj, and the character may be modified to be pointing to the GuiObj with a depiction of a hand of the character. As the hand raises or otherwise moves to a pointing orientation and/or position, a highlighting process is performed to highlight the GuiObj. Such audio and/or visual events are properly synchronized to provide a smooth animation or motion in conjunction with the messages to the user.

At this point the SeqExecBuffer has been filled with necessary components, pointers, and operators to allow the execution of the series of SeqSteps to perform the completion of the Guide Sequence Process. With the work of loading, expanding, and assembling data selection components having occurred, a next task includes coordinating the Guide Sequence's automatic processes with the user's actions being translated to OS-generated events that require monitoring and coordination with the CHA System internals.

The ChaSys component, being included in the Main Sequence Processor Module, manages the principal coordination in step 2160 of all subclassing processes, SeqExecBuffer contents, and subprocesses occurring at this stage. Furthermore, the Behavior Model, as defined by ChaSys Scripts, determines the style of interaction and the presentation of information.

For performing the processes involved in the interaction with the contents of the SeqExecBuffer, the contents of the SeqStep sets the boundaries governing all logic of internal and external occurrences. Either before or during each SeqStep process, the Main Sequence Processor marshals the input data set by filling input buffers with InfoObj and Commentary data, by processing relevant SysGuiObj structures, by filling such SysGuiObjs with extracted data from the operating system, by integrating User Custom Data, etc. Each SeqStep is executed and complete its logic until processing proceeds to the next SeqStep. Additionally, optional mechanisms are used to provide forwards or backwards navigation through SeqSteps as well as random access, within certain behavioral restrictions of the operating system.

Figure 14:
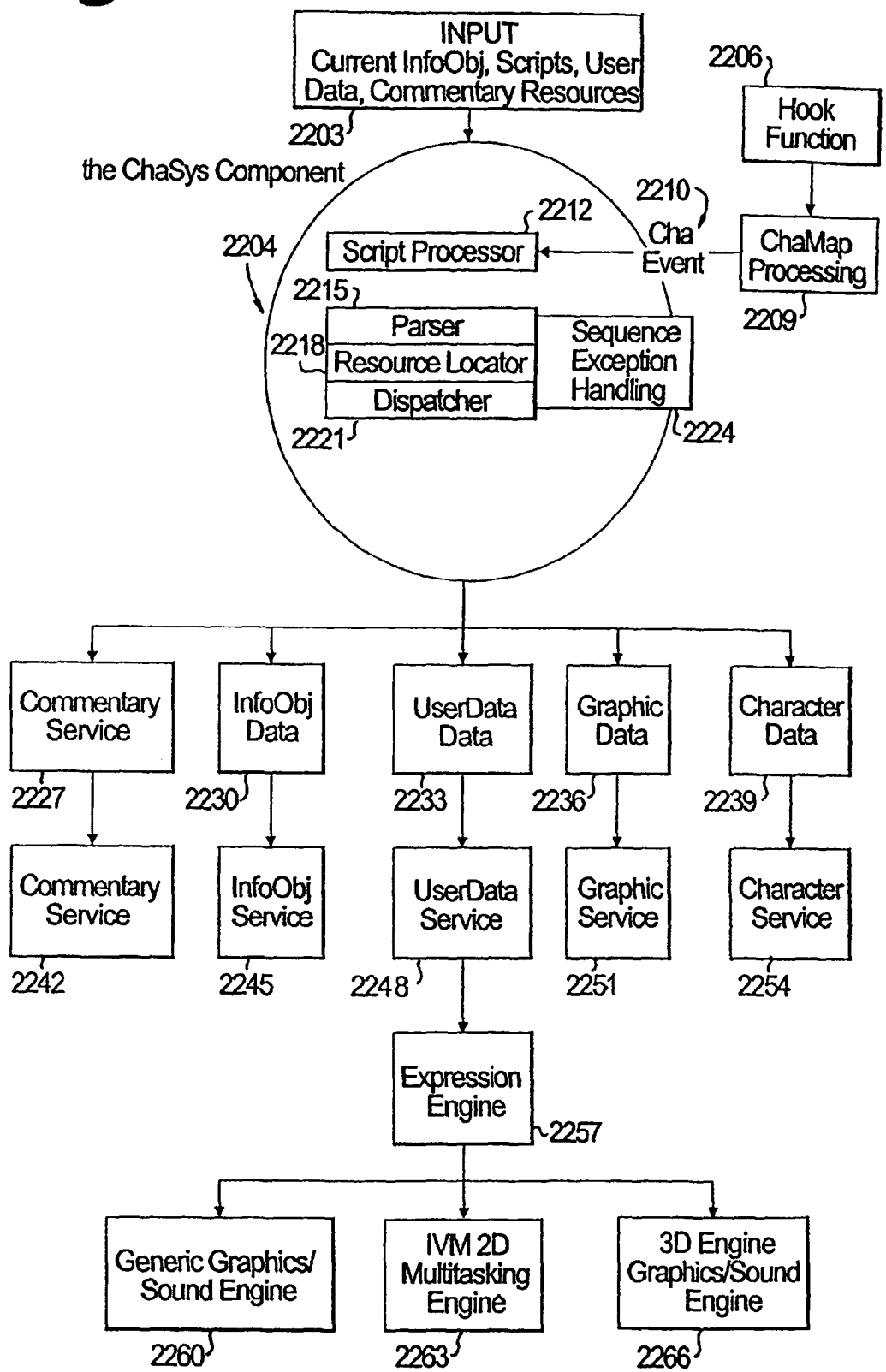
FIG. 14 illustrates Fixed Guide Sequence ChaSys Object Set Execution.
Figure 14A:
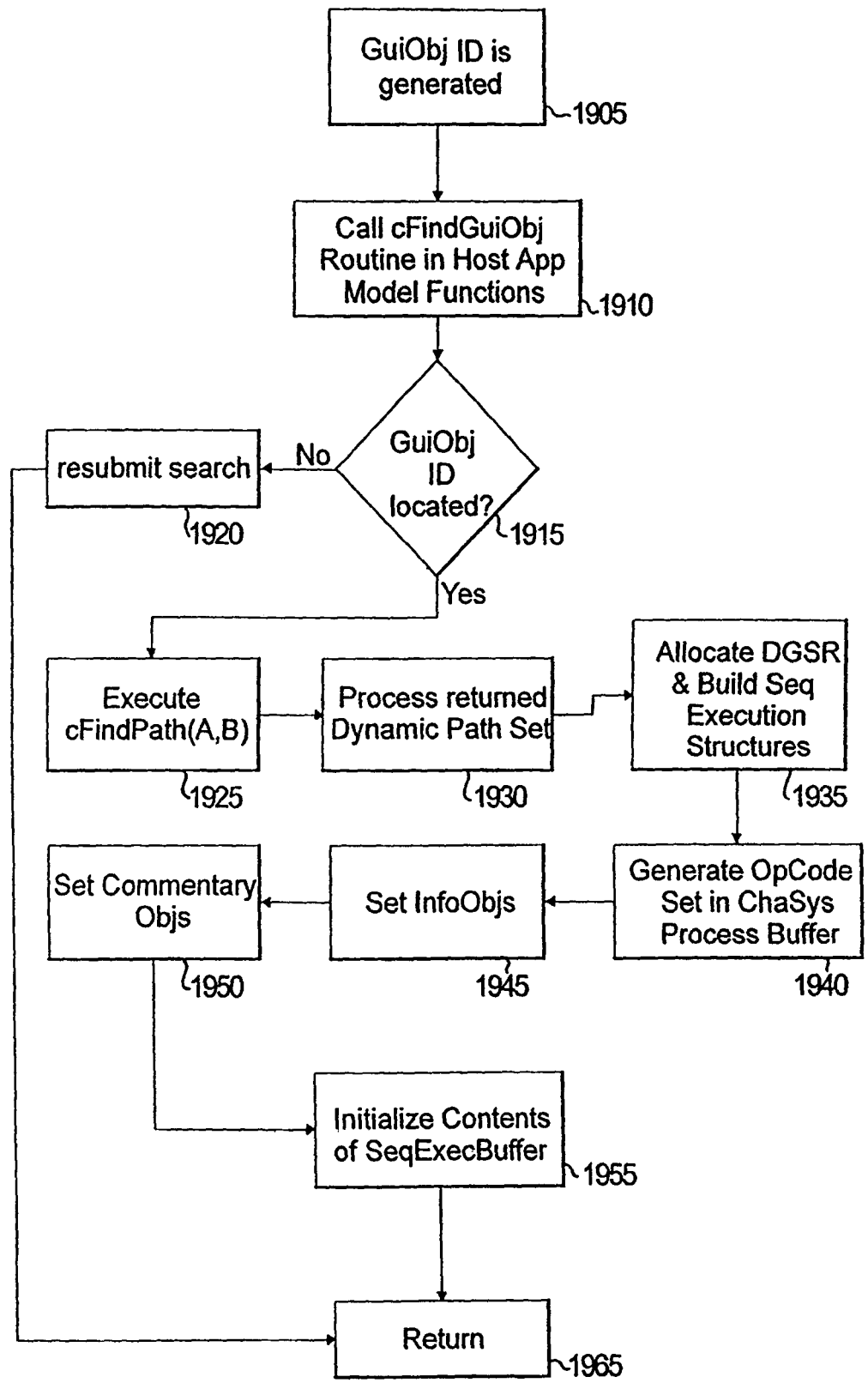
FIG. 14A illustrates Dynamic Guide Sequence Processing in greater detail.

FIG. 14 illustrates the steps 2155, 2160, 2165 and 2170 of FIG. 13 in greater detail, where the data collected in the SeqExecBuffer 2203 is the input in an interactive stage in which user actions are intercepted. The ChaSys Component 2204 performs coordination and management of processes, for example, to trigger, suspend, or control different processes during the operation of the steps shown in FIG. 14.

CHA Events 2210 are generated by the Hook Function 2206 and by ChaMap processing 2209, and such CHA Events are passed to the ChaSys Script Processor 2212 which maintains multiple processes, including a scan loop routine to detect interrupts or messages. Once such interrupts or messages are detected and received, such interrupts or messages are evaluated and routed accordingly. For example, a message may include the request by the user to abort the CHA System, may include an indication that the user has responded to an InfoObj and is interacting with a Host App interface object, or may include an indication that the user has minimized the Host Application Window, and so the processing and different CHA application threads are to be suspended in order to not use CPU processing time.

Concurrently the ChaSys Component executes associated Parser routines 2215 to evaluate each token in the Sequence Scripts. When such tokens are mapped to Script keywords, the corresponding script-token-specific functions are executed. As script code is scanned and processed, inevitable references for resources occur, in which resources can be any of the types and formats previously described. Such requests are handled by a Resource Locator section 2218 of ChaSys which operates to successfully fulfill all requests for the data types needed as input for the Expression Engine.

Once such data types have been located, the Dispatcher reads the data structure headers, determines the data type, and calls the appropriate service routines to render the demanded form of expression. This service may be performed as a registration of the request due to the need to transfer data from a remote location. In some situations, this may prevent the completion of the currently executed record entity while the request is being completed. In other situations ChaSys may allow certain adaptive steps to take place even without the pending data. While most user actuations may be correct, ChaSys uses its Sequence Exclusion Processing components 2224 to parse CHA Events and to perform comparisons to rules established in the CHA Sequence Script or the Behavior Model being referenced in order to determine incorrect Host App GuiObj responses, or inappropriate pathways. This excluding action handling component makes decisions based on the configuration of the Host App and its current window state.

FIG. 14 also shows the relations between Data items 2227 through 2239, and their respective Services 2242 through 2254. Referring to such data items and services, in the Guide Sequence method, multitasking Services are initialized and prepared for input, with such multitasking services including the various functions that handle each of the different data types including: Commentary 2227, InfoObj 2230, UserData 2233, Graphic Data 2236, animated Guide Character Data 2239, and their respective Services 2242, 2245, 2248, 2251, and 2254. As the selected Expression Engine 2257 maintains and schedules many concurrent tasks involving the IVM multimedia engine 2263, the Generic 2260, or the 3D Graphics/Sound Engines 2266, each service is allocated a share of CPU and hardware subsystem processing resources, such as the video and sound processors that manifest each data type in synchronized, scheduled events in conjunction with the computer's input. Since the Graphic and Character Data are visual and therefore utilize appropriate data types native to the operating system such as Graphic Device Interface (GDI), Application Programming Interface calls, or bitmap (.bmp) files in "MICROSOFT WINDOWS", the graphical input data is packaged in file formats indigenous to the Expression Engine's drawing techniques such as the IVM specific animation files.

A call is made to the Graphic Service 2251 which handles the Highlighting Function as well as other effects. To accomplish this task, the location of the Target GuiObj is found from the structure in the SeqExecBuffer. Next a call is made to initialize a concurrent task for the character 2254 where its current position is displayed relative to the Target GuiObj which is referenced by the InfoObj. Also, in the SeqExecBuffer, the current SeqStepStruct is examined for any InfoObjs. If an InfoObj is detected, its pointers are sent to the InfoObj Service 2245. During the processing of the InfoObj, the concurrent character or its equivalent refers to the GuiObj in a synchronized fashion such that the character points to the referred GuiObj at the appropriate moment.

A check is also performed to determine the presence of any User Data previously attached to the Host App Model structures or elsewhere or to the current InfoObj and is forwarded to its service function 2248, such User Data is present. The user is prompted to respond to directions or information given in the InfoObj using the computer's input devices for example, a keyboard, a mouse, a voice response system, etc. Actuation of any of these devices generates "MICROSOFT WINDOWS" messages that are intercepted by the CHA Hooking Function 2206, and then passed to ChaMap 2209, which intelligently filters a multitude of operating system generated messages. The ChaMap 2209 interprets such messages as CHA Events, and then dispatches a reduced set generated from such messages to the Main Sequence Processor including the ChaSys component. Upon receiving this Hooking Function and ChaMap-generated CHA Event set 2210, ChaSys evaluates the CHA Event set, and if a user's action is detected to be outside of the Guide Sequence's path, the Sequence Exclusion Processing section 2224 further evaluates and generates directives leading to an appropriate negative response and feedback.

From each of the Services of the different data types, the final manifestation stage is performed which renders each data type for audio, sound and both static or animated graphics. In this phase the Expression Engine 2170 uses the selected Multimedia multitasking engine such as the IVM Object, and for each of the input data types the Expression Engine 2170 uses selectively the different hardware components to display or play sound, such as text-to-speech engines or other audio mechanisms, as well as streaming network audio, for output to the user In addition, ChaSys can trigger a Guide Sequence Reset command for the reprocessing and reassembling of all data and code components in the SeqExecBuffer to accommodate situations requiring data updating, such as changes in strategy, or path directions if the user wishes to branch away from the Guide Sequence or to invoke the Explore Mode. Once the new pathways are determined through a variety of mechanisms such as by use of the Interface Map Tool, reconstruction including the new elements occurs in stages 2105 through 2170. Another cause for a Reset command to be executed may occur if the CHA System detects changes in the Host App interface, and so the operating system message is detected which triggers an updating of internal GuiObj structures, and hence the SeqExecBuffer contents are also updated This exemplifies the adaptive response and dynamic behavior of the CHA System versus the inherent fixed architectures and a hard coded scripting systems and methods approach.

The expression component i.e. interactive and multimedia processes can be implemented in many ways, for example, using script languages, C/C++, or any other computer language that controls visual or aural processes. In an illustrative embodiment, the CHA system and method uses a scripting language which is a "virtual machine" that performs very efficiently in a wide variety of environments and is portable to different operating systems. Other engines for expression can also be used. The use of script languages is a common technique for simplifying a set of known operations in a problem domain and can automate many operations normally requiring specialized knowledge or considerable manual programming effort.

In specific Dynamic CHA modes of operation, direct scripting is not needed. However, optional scripting for specific tasks is still made available for flexible development. In the CHA System there are two accessible layers that control the Sequence execution: in the ChaSys component and in the Expression Engine using the IVM Class object. A multi-tiered architecture using, for example, scripting, provides for a separation of functionality and eases production, and alternatively allows portability to various operating systems and operating environments or different application frameworks. The CHA System's run-time components utilizes the Sequence ChaSys Script partitioned into a series of SeqStep Scripts as well as the Expression Engine's IVM Scripts.

The benefits of this multi-level feature includes the facilitation of a more simplified, modular design, as well as ease of maintenance, the development tools interface, and the more convenient management of all InfoObjs and Commentary-Objs and other types of data. An additional benefit of use of the Script language is its flexible delivery and dynamic, modular, and compact properties. For example the Sequence Scripts can be independently compiled prior to use, or compiled dynamically, just-in-time or on-demand, and furthermore, can enable the rapid switching of different sets of data such as InfoObjs in requirements for applications such as in different language presentations. In alternative embodiments, scripts may optionally be replaced by any of a number of different computer languages as known in the art.

Note that while the description focuses on the creation of Guide Sequences on single applications, the invention also can coordinate events in multiple Host Applications with a single ChaSys Multi Application Script. This is accomplished by creating multiple instances of Hooking Functions, one for each application and routing the hooking messages which map to analyzed CHA Events. Such analyzed CHA events are then passed across applications to a single collective functioning entity named the Multi ChaMap Processor that resides within a single "Super" CHA run-time instance. This Multi ChaMap Processor handles messages across multiple Host Applications, and passes them on to the Super CHASys Engine instance which interprets actions for the different applications by further expansion of GuiObj ID's which contain a prefix application identifier i.e. codes referring to CHA registered applications. The GuiObj Key values are furthermore mapped to the appropriate Host App Models for their respective Host Applications. The handling of multiple application contexts is a natural extension of the inherent architecture of the singular CHA process example given and may be implemented in a manner known in the art.

As described herein, the disclosed CHA system may operate using Fixed Guide Sequences. The CHA system may also operating using Dynamic Guide Sequences, as described herein, which may be considered dynamic counterparts to the Fixed Guide Sequences.

While sharing many of the same modules and routines as in Fixed Guide Sequences, Dynamic types differ in that the Dynamic Guide Sequence rapidly responds to a user's spontaneous navigational commands while interacting in a live Host App Session. Unlike prior art assistance systems, the disclosed CHA System and method in its Dynamic Mode of operation does not require the preparation of every path permutation to every Target GuiObj, and do not use fixed content Sequence Records retrieved from a set of fixed data storage files. Instead, single Target GuiObjs on the Interface Map Tool can calculate and generate P Paths with N SeqSteps, where P=all possible permutations within the rules of the given Behavior Model, from N=0 to MaxSteps, using path-finding heuristics and algorithms.

The value for P may be extremely large such that a user may use the CHA application for a very long period of use and never exactly repeat all the Commentary or InfoObj combinations of events presented in the Dynamic Guide Sequence. The CHA System and method also create Connective Language Phrases from the Commentary Data Set and its mechanisms to set up the execution of InfoObjs, in which Connective Language Phrases are spoken or textually rendered and function to finish an action or to introduce the next user action. Additionally, multiple Target GuiObjs are supported for multi-path generation and the compilation of a series of Sequences.

FIG. 14A describes the related processes of the Dynamic Sequence. First, a Symbolic Map Interface (SMI) is rendered and displayed to the user in a CHA Search Tool 2110, shown in FIG. 13, that provides visualization of the interface. In the SMI the user inputs a selection i.e. one or more Target GuiObjs, with the input device, such as a pointing device or keyboard, and returns the corresponding GuiObj ID 1905 which is an identifier for a GuiObj that is referenced in the script code or by an opcode set. The GuiObj ID is also then mapped to a GuiObj Key, which is used for Host App Model lookups. The CHA system and method proceeds to execute the function cFindGuiObj 1910, such that the Host App Model is searched to locate the Target GuiObj record in the interface model description. A test is made 1915 to verify that the destination GuiObj is found. If not, processing in step 1920 is performed to resubmit, redo or perform another search, and then to return to the Search Tool in step 1965. If yes in step 1915, then a second call to cFindGuiObj finds the record of the Current Location of the user, or the user can instead specify a specific staring point anywhere in the Host App.

Once the starting GuiObj is found, the cFindPath(A,B) routine is performed 1925, in which A and B are start and end locations, respectively, so that the cFindPath(A,B) routine is used to determine the best path, or alternatively or a set of alternate paths i.e. a Dynamic Paths Set 1930, between the Current Location and the Target GuiObj. The cFindPath(A,B) returns a set of cPathVectors which is a structure that contains all relevant pointer information to Host App Model records.

Initialization of the Dynamic Guide Sequence Module occurs, which also includes the main loop processing and the sequence termination mechanism. Using the cPathVectors Structure found by cFindPath, a Dynamic Guide Sequence Record (DGSR) is created 1935, including a series of Transport GuiObjs, in the SeqExecBuffer. In addition, data structures are created with initial SysGuiObj information and their links to GuiObjs, including data from the Host App Model and including GuiObj Link information. Additionally ChaSys Script source code or binary opcodes are generated and inserted into the ChaSys Processing Buffer 1940 for processing during the Sequence execution. The Dynamic Guide Sequence Script or its associative opcode set is automatically generated and inserted into the buffer for later processing by the ChaSys Script Processor.

Continuing, in 1945 InfoObjs are retrieved according to the InfoObj Detail Level parameters which determine what data sets are selected at each SeqStep during the current Dynamic Guide Sequence (DGS) Process. Pointers to the Host App InfoObj Set are determined for Sequence Processing and stored into the SeqExecBuffer. Optionally instead of pointers, actual data can be packed into the SeqExecBuffer for collection, compression, and export such as in the case of server/client delivery. Similarly at 1950 the Commentary Levels are used in preparation of the Commentary object data retrieved from ChaDB. Interleaved into the SeqExecBuffer DGS record and the SeqSteps, the Commentary data is ready for processing and depending on options, either as pointers to data or the actual data which can be packed and prepared for network transmission. Next, the SeqExecBuffer is initialized 1955 and prepared in a manner compatible with components that are shared with Fixed Guide Sequence Processing as described previously. Next processing returns 1965 to FIG. 13 and proceeds to 2150 for execution of the generated Guide Sequence.

The CHA System's Explore Mode also utilizes these Dynamic mechanisms. In the Explore Mode, instead of laying out the entire DGS Record containing N SeqSteps ahead of time, requests are made to the Symbolic Map Interface on an incremental, step-by-step basis. Each step, as a SeqStep, is completely executed one at a time, and when each step is completed, the CHA system and method return to fetch and respond to the next directive from the user for a GuiObj selection. The user can explore parts of an application or the entire application, and data is presented at different requested levels while the user interacts with the Live Application. Certain restrictions may be implemented which prevent inconsistent operations during this mode to preserve the integrity and synchronization of the application state with the InfoObj Set. During the exploration, choices can also be made as to whether Host App parameters are actually set or not.

The CHA System may also optionally undo any changes made, may enable only Transport GuiObjs, or may, for example, respond to the action of a user to an accidental actuation of the Cancel instead of the OK button in a dialog box. Variations in the use of the application may be viewed in the Explore mode, such as options for the most direct route, different levels of detail, verbosity, the altering of connection phrases from the Commentary Set, etc., and such variations may be adjusted with parameters through a CHA controls interface. When the DGS record is created and filled, program flow proceeds to step 2123 in FIG. 13 where it begins a Dynamic type processing.

In Explore Mode, path finding algorithms are applied to the Host App Model to find a path in real-time. An input flag is set which determines the InfoObj Detail Level during exploration, or which determines a traversal operation through the path. The InfoObj Detail Level (IODL) determines which level and parts of the database of InfoObjs are accessed, and which data is retrieved. The IODL determines the scope of its description. For example, if the level is a Summary value, then the InfoObj retrieved include general information about the GuiObj e.g. information for use in a message to a user such as "This dialog box contains a set of controls for determining the format of a word processing document." As the path is traversed and data is retrieved from the ChaDB, InfoObj data and other elements such as Non-Essential, Negative-Response, or Positive-Response Commentary can also be constructed in real-time, depending on global and parameter settings, and presented to the user using the IVM class engine for expression.

Finally, while a given Guide Sequence presents itself as a fixed series along a path of GuiObjs, with a CHA control, this fixed path can be broken and departed from via auxiliary alternative methods. The CHA System first preserves its current state with a stack-like Push State function, and then unlocks entry to other parts of the application not on the current sequence's GuiObj Path, with run time mechanisms for the generation of GuiObj Paths along with parameters controlling InfoObj Detail Level retrieval. Such operations may be performed either through the entry to Explore Mode, or through Dynamic Guide Sequence system processing. With a CHA control, the user can choose to return to the initial Guide Sequence path after a Pop State command is executed and resume subsequent SeqSteps till the series is completed.

Another major CHA mode, the Monitor Mode's purpose is to identify logical patterns from a set of user input actions, and to execute one of a number of functions, including: automatically create CHA Guide Sequences, construct ICAPs, or generate Inference Actions. When the CHA Monitor is activated, the CHA Hooking Function, which subclasses windows intercepts and monitors all user actions with the Host App. Every action or a subset of GuiObj actions are recorded. For example, for every mouse left button click on an interface button or any other GuiObj interaction, a CHA Monitor Event data record is stored into a separate monitoring database. A Session Monitor Data Set thus accumulates over a user set time period. Either at a scheduled time or invoked by the user, the CHA Monitor subsystem prompts the user, and upon the user responding affirmatively, causes the CHA Monitor process to begin a compilation and analysis of the accumulated Session Monitor Data Processing of the Session Monitor Data is performed in cooperation with ChaDB the latter being built by the CHA developer with the CHA Development Environment (CDE). CHA Procedures that are a result of Session Monitor Data analysis and later Sequence generation processing, on demand, assistance can be invoked, and intelligent options can be implied, deduced and generated. The CHA System can provide the user a number of choices such as suggestions of faster ways to accomplish repeated tasks, or can offer ICAP commands i.e. automated procedures that are automatically assembled by the CHA System and included in the ICAP List for random ICAP Command access. These automatically built procedures can replace or supplement the familiar "Record Macro" tool available in many of today's applications. The standard Record Macro tool allows for the recording and reproducing of a user's actions for a sequence of steps. While still offering recording facilities, the CHA System's ability to generate accelerated procedures for specifically Target GuiObjs automatically is advantageous in its ability to perform such procedures dynamically in real-time.

There are three stages during CHA Monitoring: Collection, real-time Context Evaluation, and Non-Real-Time Context Evaluation. The Collection stage stores the user's actions for later analysis. The real-time Context process consults the Host App Model in order to derive contextual suggestions for using the application, or embeds markers into the stream of actions being monitored. The Non-Real-Time Context process can perform more in-depth analysis and multi-pass processing on the collected data set gathered during the Collection Stage to produce reports, in context assistance, or automatically constructed Accelerated Procedures.

Figure 15:
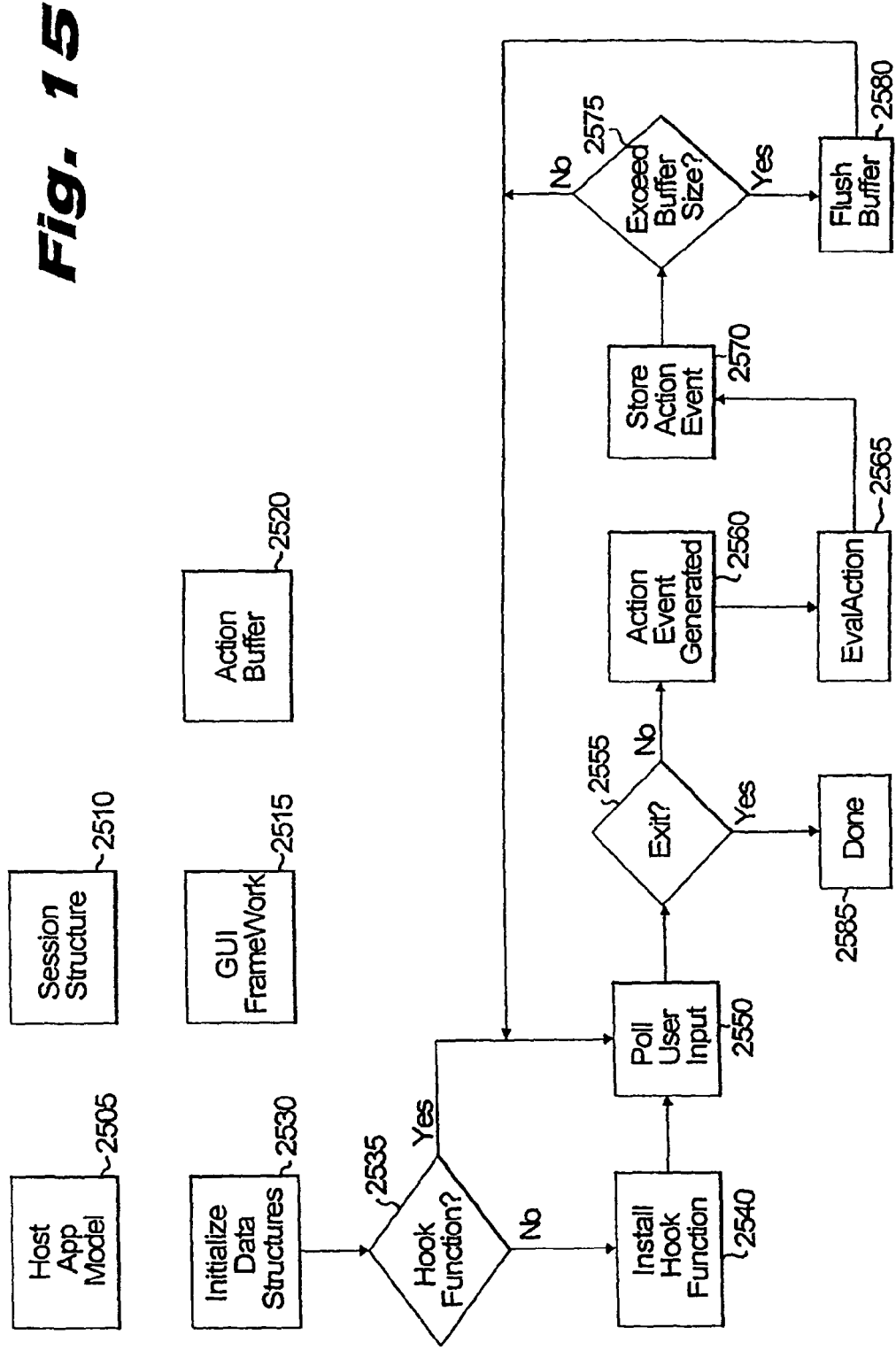
FIG. 15 illustrates CHA Monitor Collection Processing.

Referring to FIG. 15, program flow begins with the launching of the CHA Monitor components. The Host App Model 2505 is stored in the ChaDB, and includes a Host Application Model i.e. an optimal interface structure for the CHA Monitor Mode, referred to here as the GuiFramework which is referenced for both navigation and intelligent inference. Besides representations of all instances of every GuiObj in the application, this framework also contains all link and connective information such that traversal actions, symbolic representations, and other operations can be processed or generated. Data structures 2530 are initialized and include a current Session Structure 2510 and a GuiFramework 2515, a Session flag to set the state of the GuiFramework, and a Session Identifier. The Session Structure is the global structure that organizes data events being collected during the Monitor Phase, including data events pertaining to Session Control Information. Additionally, the GuiFramework reflects the Host Application Interface, and provides a logical description included in the Host App Model, which is referenced during the evaluation stage of user input.

Upon completion of initialization, a first test is performed to verify that the Hooking Function is ready for operation. If so, processing proceeds; otherwise, the Hooking Function is injected into the Host Application 2540, as described in greater detail with reference to Hook programming in conjunction with FIG. 7. During the Collection Stage, user input is polled 2550, and if the user actuates any mouse button or keyboard key, except for mode control codes such as an Exit command 2555, an Action Structure is created 2560 and processed by EvalAction 2565. The Action structure includes Status flags used to mark structures for tracking continuous paths during the analysis phase. The module EvalAction 2565 performs rapid intermediate level evaluation that also facilitates later analysis. This evaluation may be performed minimally for optimal processing speeds, since such evaluations may cause interference with Host App performance.

The EvalAction module also has a second real-time mode of operation that evaluates user inputs in real-time rather than in a post-operation, non-real-time processing. Capabilities of the real-time module depend on the computer environment, the type of application being monitored, and the requirements of the application. The Main Ref State may be a default, basic starting position in the Host Application retrieved from the GuiFramework from which all action series and potential sequences can be referenced. The Main Ref State acts as a reset point for CHA Sequences in an attempt to decipher start and end points for potential CHA Sequences. When the Main Ref State is detected, the EvalAction module sets the Main Ref State flag in the current Action structure.

Another function performed in the EvalAction module is to search for potential Sequences that can be later processed as automated procedures. This is accomplished by searching for Continuities, which are a series of input steps that pass through consecutive portions of the interface hierarchy as described in the GuiFramework contained in the Host App Model, that lead to Parameter GuiObjs which are interface objects for setting the Host Application persistent state e.g. a checkbox. As an Action Structure is evaluated, it is flagged and a reference to it is placed into a Potential Sequence Tracking index which is used in later post-processing for ICAP verification. The Action event is then stored 2570. A test is also made to determine if the Memory Buffer A is full 2575, and so to flush the buffer 2580 into a permanent file i.e. the Session Record. This process repeats until the end of the session.

Figure 15A:
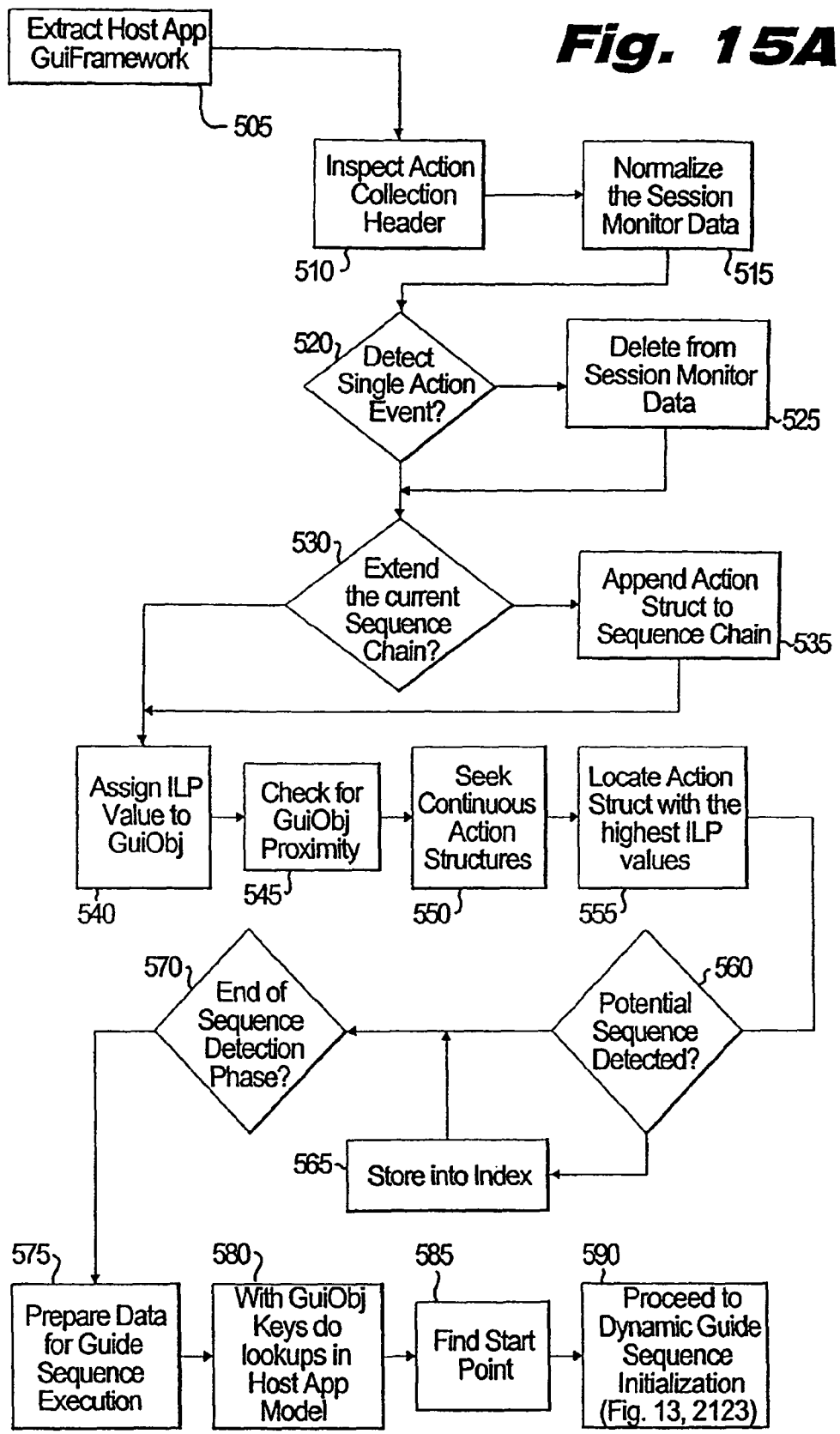
FIG. 15A illustrates CHA Monitor and Dynamic Sequence Preparation.

Referring to FIG. 15A, from the Host App Model, the GuiFramework is first extracted from the database and placed into available memory structures. The Host App Model's GuiFramework includes an application's interface controls, including the Transport GuiObjs that reflect the different navigational states of the Host App. The initial processing stage of the GuiFramework expands the data into a run-time form. The Host's GuiFramework 505 is normally maintained in a compressed form to reduce resource requirements, and, upon loading, the GuiFramework is then expanded via implicit rules into an interlinked, indexed network structure in memory which prepares it for fast random access. Furthermore, depending on the size of the GuiFramework structure, portions may be cached on disk or stored in a network-connected connected database, with a memory resident cache index mechanism used to manage the loading of data from other locations e.g. disk to memory or across networks as required on demand.

As shown in FIG. 15A, header information 510 is provided which includes an Initial Index which was created during the Action Collection recording process. The Initial Index points to a rough form of the data which identifies Sequences or potential Sequences detected during recording. Such identification reduces subsequent analysis since the data is already divided into individual sections with some degree of accuracy instead of having the data maintained in a monolithic block. Additionally the user can input optional directives during the input process which can assist later analysis. The next stage involves normalization 515 of the Session Monitor Data (SMD), which employs a number of processes. One process is the removal of extraneous pointer device movements, meaningless keystrokes, and/or Action structures, as well as "non-event." Actions such as when a dialog box is opened, but in which no Host App parameter is altered.

Other actions are separated and removed, such as actions which involve Tool Bars or controls that execute some function with a single action, for example a mouse click or a keystroke accelerator. Any records of interactions with toolbar GuiObjs are also separated out of the SMD set. From detection of this type of Single Action Event 520 its structure is flagged and eliminated 525 from the captured Monitor data. From this SMD set, the Monitor's processing goal is to identify a Sequence which is a series of Actions that either accesses or navigates a useful i.e. frequent GuiObj Path or alters one or more parameters in the Host Application via a Parameter GuiObj. The latter action usually leads to a Host App state Change. Therefore any series of actions that reaches a Parameter GuiObj, for example, in which a parameter is changed, is marked (SeqEndFlag=1) as a potential Sequence.

Further investigation of neighboring GuiObjs reveals the extent of the current potential Sequence. A probing process to find out if adjacent Actions go further into continuous levels of the Host App's interface structure i.e. extended 530, then the current Sequence Chain is expanded to include the new structure 535. This probing process continues until the Sequence Chain is determined to be complete. When done then a check is made for a Parameter GuiObj being modified. A few additional checks are made to verify that this is a true Sequence endpoint i.e. an investigation seeks a break of Continuity in the Action Structures. Note a break of Continuity is defined as a series of actions where a Parameter GuiObj is set or altered and followed by a series of Cancel or OK buttons (Transport GuiObjs) that causes a return to the Main Ref State of the Application. The GuiObj's Interface Level Position (ILP) is the value corresponding to any given GuiObj's relative position in the hierarchy of the Host App's interface as described in the GuiFramework. The GuiObj's are given an ILP Value 540 e.g. zero may be the highest level ("root"), while N>0 is the largest value and represents the deepest level of the application interface.

The Monitor Processor first attempts to locate all Action Events with the highest ILP value i.e. GuiObjs located at the deepest levels of the Host interface. The intermediate pattern being sought involves any Action Structures with Continuous Properties, such that Continuous Properties are values within the Action Structures that represent proximity 545 i.e. consecutive ordinal positions within the Host App GuiFramework, for example, paths along the Transport GuiObjs. Conversely, a series of Actions Structures is considered to be discontinuous if it has "breaks" in consecutive ILP values or if it includes a series of Cancel/OKGuiObj interactions.

Inspection of the Transport GuiObjs traversed, along with any Parameter GuiObjs, reveals any continuous Actions 550. Other Action Structures with Continuous Properties might be a series of interactions with one or more controls contained in a group i.e. a dialog box. Those Action Structures with the highest ILP values 555, at the deepest interface levels, are flagged and marked as possible Target GuiObjs. The surrounding proximal Action structures are also inspected for further logical continuities. Target GuiObjs and their associated Action Structures with Continuous Properties are indexed or collected, and are further processed to produce generated Sequences output. Once created, a check is made for a potential Sequence 560 and if identified it is sent to a list for later inspection or processing by the user. Generally, the Monitor Analysis tries to locate all Continuous Actions to identify their starting and ending points. Heuristics may be used to determine these start/end points based on their logical "degree of continuity" in respect to the GuiFramework. The previously described properties of Continuity, ILP Values, and the detection of Parameter GuiObjs are used in the detection process 560 of Sequence candidates where if found they are stored 565, followed by a check if all SMD data has been thoroughly processed i.e. the completion of the probing phase for possible Sequences 570.

In addition there are a number of helpful characteristics that assist the analysis process. For example, the presence of Transport GuiObjs may be used such as Cancel and OK that are helpful in identifying profiles of any Action Structures series for Sequence identification. Another characteristic is the Host App Main Ref State, which acts as a known stasis point that is usually the start-up state of an application. Being the first "stable" processing point reached after first invoking the program and becoming ready for user modification of the primary file, the Main Ref State is a stable position from which to launch CHA Sequences into the depths of the program. Another set of identifiers are Monitor Record Markers embedded by user actions e.g. a keystroke, that mark particular GuiObjs as potential Target GuiObjs. Furthermore, queries can collect information from the user that can be used as clues to help identify targets. For example, the user may list keyword terms such as "Fonts", or "Colors" that can be searched in ChaDB and mapped to GuiObjs which in turn, can be detected in the Session Monitor Data (SMD). Once patterns have been marked as potential candidates for Sequences, the user is prompted for interactive selection of the types of output to be generated. After determining and sorting out their choices, Sequence construction processing can begin.

Once the GuiObj or GuiObj Group are identified during analysis of the SMD set, the Host App Model and Sequence generating code can be used. Referring to FIGS. 12-14 and 14A, the CHA Monitor's Auto Sequence Generation shares significant portions of the Dynamic Guide Sequence process in which the sequence entry point, upon completion of the Monitor Analysis phase, is found at 2123 in FIG. 13. Given the Potential Sequence Set defined by a series of Action Structures framed by Start and End points, the processing of Auto Sequence Generation begins by preparing the input data for Guide Sequence execution 575. Using the GuiObj IDs and Keys embedded in the Action Structures, lookups 580 are performed in the Host App Model using functions from the Host App Model Processor Module 2040, shown in FIG. 12 such as cFindGuiObj and cFindPath. In some cases, the input Action Structures may include a single entry i.e. the Target GuiObj. With the Target GuiObj as the target, the Host App Model deduces the proper path from a given start point 585 such as the Main Ref State position. This default start point position can also be user-controlled or modified via an editing tool interface. All this pre-processed and collected data becomes input preparation for the Dynamic processing flow that follows i.e. the module executes a Return 590 and resumes processing as described in FIG. 13 "Dynamic Fixed Guide Sequence Processing" at 2123.

The problems in the prior art of working with copious amounts of confusing data are obviated by the disclosed CHA system and method by using a Monitor Tool that provides various processing and filtering functions to compile useful sequences. These sequences can be collected for later random access and compilation of a knowledge/action foundation for productive use in the Host Application. The Monitor Tool represents Action Events symbolically as icons with associated data windows that display a set of parameters associated with the Action event. As the user interacts with the tool's symbolic interface, messages can be sent to the Host Application and thus demonstrate on the live Host App the particular portions of the GUI interface which are controlled or associated with a selected Action Event Furthermore, by interactively using filtering and other processes of elimination, viewing this representation of the Host App allows the user to either incorporate or eliminate members from the list of symbolic Action Events. Each Sequence identified from the previous analysis stage can be executed and demonstrated for the user's verification and subsequently exported to the ICAP list for later access. ICAP procedures located in ICAP Lists can be further accessed, combined or edited. An additional feature provided in the Monitor Tool is a Metrics feature that assesses the use of the Host App and retains statistics on usage for reporting on demand.

For usage analysis and automated procedure building, the CHA Monitor system can be applied to any GUI-based application program in any operating system including web browser applications for the Internet, intranets, extranets, etc. The use of the CHA System and method to web browsing enables the analysis of any program or web page, and the generation of reports and statistics about how often and in what manner interface objects are used as well as methods for facilitating or accelerating interaction. This concludes the discussion on CHA Monitoring.

A CHA Development Environment (CDE) Tool is provided which has a number of important functions. Based on the infrastructure as previously described, the CDE Tool is used to create instances of the various data types and to package and integrate them into the ChaDB, including the Host App Model, ready for delivery on any platform to support Dynamic Guide Sequences. Furthermore, the CDE Tool is also used for the creation of Fixed Guide Sequences.

The CDE Tool main interface includes a Main window and a Production Toolbar window, in which the Main window includes all of the central interfaces for control of all processes and modes. Additionally there are also interfaces for setting global settings, various global object properties, and data file management facilities. The CDE Tool runs in both multiple networked mode on a network of computers as well as in single computer mode. The development network operation mode is most efficient to permit the running of the Host Application on a dedicated machine while the CDE Tool interfaces, debugging, and monitoring functions can run on their own dedicated computer resources. This has the added advantage of making all CHA Run Time processes transparent to the Host Application and of having minimal impact on the operation of the Host Application.

The CDE Tool attaches InfoObjs to any of the Host App's GuiObjs and integrates the attached InfoObjs into the ChaDB. This tool allows for any number of different InfoObj resources to be attached to any GuiObj. While referencing the Host App Model, the InfoObj Attachment Process is performed by selecting the AttachInfoObj Button from the CDE Tool's Main Window and having the cursor. Concurrently, status captions and displays reflect the AttachInfoObj Mode of operation. A developer points to any Host App's GuiObj, and "locks" or selects the GuiObj with the Lock Control. The user may not be allowed to actuate other GuiObjs until the current selected GuiObj is unlocked Concurrently, status indicators display an icon that indicates the mode, and any known property information displayed in text about the locked GuiObj.

Numerous selections appear in a GUI interface Resource List, and either through prompts or interface objects, code is invoked that injects into the record of the current Locked GuiObj one of the following selections: an InfoObj of different types Text and correspondent Voice Renderings, Static Illustration, Animation, or Interactive type. An Interactive Object Type may be implemented in many configurations, ranging from a simple implementation to an advanced level of complexity of interactivity to offer a range of interactions from simple to very complex involving extensive animation and rapid reaction to user input in the control of many tasks. This Interactive Object can appear in the Adjunct Window. The CHA system and method proceeds to determine if a resource item does not exist or is unavailable for use. If so, the user can create or enter a new instance of any of the previous InfoObj types by entering a text object, by recording a voice file, or by invoking a more complex tool Interactive Development Tool used for creating Interactive objects and activities.

Upon creation, the user names or labels the resource and actuates the Submit InfoObj Button which then attaches the InfoObj to the current GuiObj record. The tool also enters one or more parameters as determined by the type, and the user also has the option to specify and/or input additional parameters or parameter values for the selected InfoObj. Additional Expression Behavior, i.e. properties rendered in the Expression Engine, are controlled by parameters for different InfoObj types such as Spatial Properties and Positioning information. Other expression-related parameters include Relative Offsets for an object's origin, Graphics Behaviors, Appearance Style, Wipe Style, Scrolling, Scheduling a time interval for appearance, and Interactive which includes waiting for a user to actuate or control an expression to disappear. Other property categories of the current Locked GuiObj include GuiObj Highlighting Style, and GuiObj Highlighting enabling. Using the interface provided in the CDE, the user then selects from the above options until the user determines that the current Locked targeted GuiObj is sufficiently complete or specified. When all parameters and/or parameter values are specified and/or input, the current GuiObj is Unlocked and the next GuiObj is processed until the Host App's support development is completed.

Additionally, the CDE Tool also includes a Fixed Sequence Creation Command that organizes and permits the execution of a number of procedural steps for building Fixed Guide Sequences. From the Guide Sequence Building interface controls, the Sequence New button is activated to begin building the sequence. When the user actuates the targeted GuiObj, a window appears which indicates a categorized list of available InfoObj resources that have been built into the selected GuiObj record during the InfoObj Attachment session. If there is only one InfoObj, then the InfoObj automatically appears as the user would actually view the InfoObj. Between multiple InfoObjs, there can be a variety of relationships. For example, more than one InfoObj resource may be joined together or associated with each other using the Chain command. An InfoObj can be invoked conditionally, depending on an internal interpreter, a user input or setting e.g. InfoObj Detail Level, or a Host App's action. More than one InfoObj can be displayed concurrently e.g. Text and Graphic InfoObjs. Each InfoObj can be set to display, for a specific time interval, InfoObjs having animation properties such as moving across the screen or drawing in different wipe styles e.g. the object fades in.

Generally the CHA System provides a run-time platform for the capture and recreation of an application's states that can be delivered remotely through known network techniques. Located on the CHA Server, the ChaDB Server Component using one or more CHA Databases, determines targets and pathways to be compiled into a CHA System output i.e. as Fixed or Dynamic Guide Sequences or as ICAP solutions. The Guide Sequences are converted into at least one of a set of selectable compact Assistance Execution Formats configured for different solutions which can be transmitted over networks of various bandwidths to client computers hosting CHA System run-time components.

There are numerous applications for a CHA Server that provides various Assistance Execution Formats. For example, in Collaborative Activities, users trade CHA Sequences or post such CHA Sequences for others users to use. Also, Training may be implemented with the CHA Server, allowing an on-line live tutor to monitor user progress, or for allowing a user to retrieve Tech Support for individual application or system problems. Other applications include user learning remote execution of Guide Sequences for example, for live tech support; collaborative activities and applications; live interaction with other users, and instruction.

The CHA server offers an extensive CHA Database of assistance that can be selectively downloaded and/or accessed on demand. Such assistance CHA sequences can be accessed and the user may be charged with a fee by extent or duration of use, and customers may be permitted to rent CHA sequences for a prescribed period of time. The CHA Server implements a number of functions which include the determination of the profile of the user whose access privileges are dependent on criteria e.g. a payment plan; the notification and the updating of client resources and components; and the tracking of which CHA run-time components and resources reside on a user's system.

The CHA System Guide Sequences and Procedures alleviate the problem of real-time synchronization of events and the display of such events between two computers over narrow networked bandwidths in known remote control software systems. The CHA System alternative, implementing the capture, modification, and delivery of Sequences, makes an effective support mechanism for users. For example, a technical support person can send the user Guide Sequences to execute a software fix or to lead the user through a procedure to rectify a technical problem in the user's computer. In another scenario, a user can capture a set of actions and convert such actions into a Sequence that can be sent to a support person for analysis. The tech support "plays" or simulates the Sequence, makes a correction or otherwise modifies the Sequence, and then returns the corrected Sequence to the user who then executes the Sequences as the solution to a particular problem or query. Auxiliary data or instructions can be easily embedded into the solution Sequence. Alternatively a user can also browse or search through lists of solution Sequences in a compact form, download a selection of such solution Sequences, and execute any specific Sequence as needed or desired, or else at least one solution Sequence can be requested by the user, and E-mailed or otherwise delivered to the user for implementation. Furthermore, the tech support person may be able to activate a request for an Assistance Topic which is then generated and forwarded to a user via E-mail or other software delivery methods.

Overall, the CHA system and method may be used to execute a finely tuned, interleaving on-line delivery of assistance information, which may include software as a solution Sequence, to the user and to provide the delivery mechanism needed to make CHA work under stringent or demanding network conditions. The CHA system and method achieve such results because Guide Sequences are partitioned into segments called SeqSteps, in which each SeqStep can be delivered as a separate, asynchronous data stream. By queuing up future SeqSteps, subsequent SeqSteps can be delivered asynchronously while executing current ones to provide a more seamless, wait-less user experience.

Figure 16:
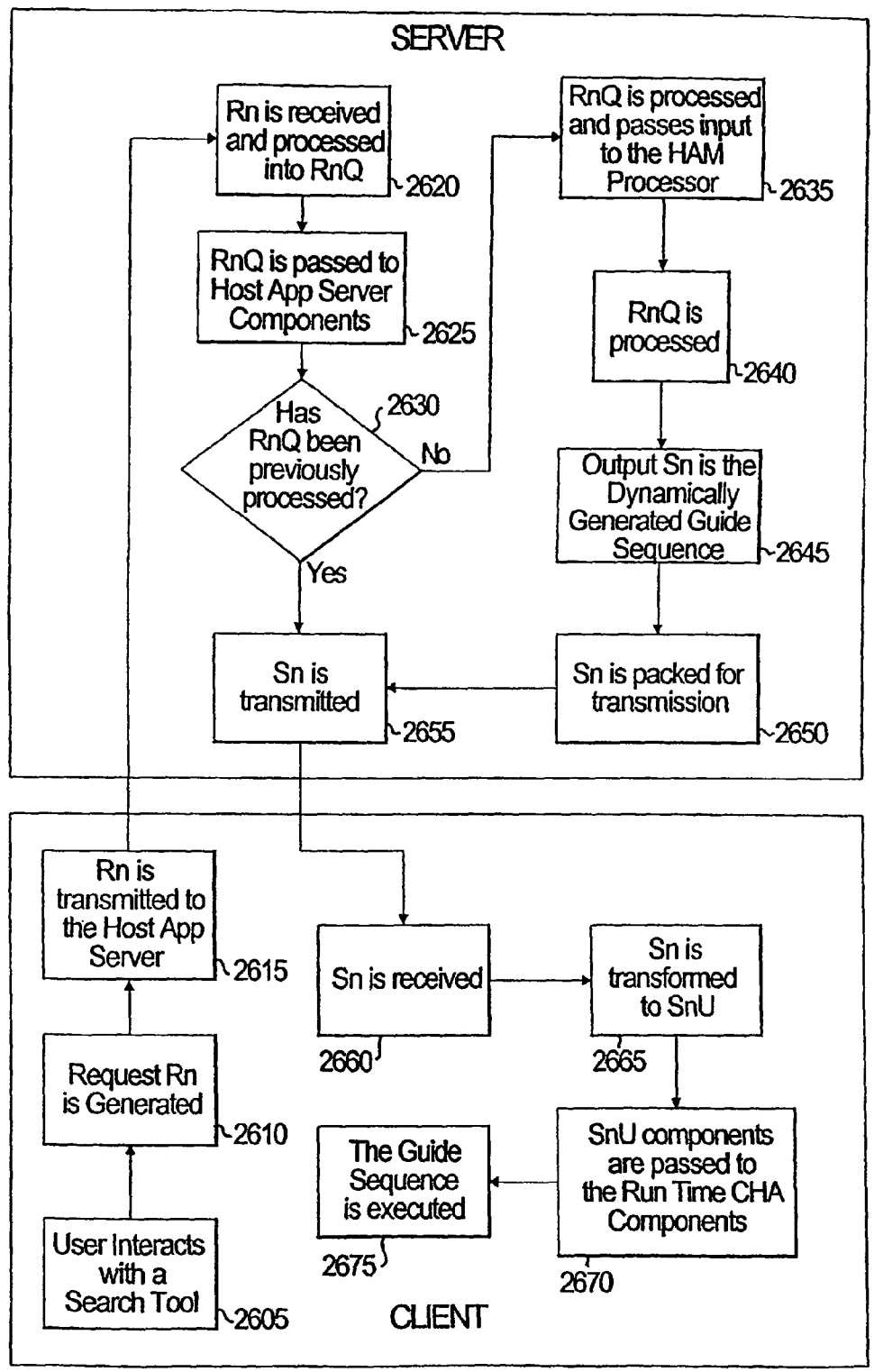
FIG. 16 illustrates Client/Server Interaction for Dynamic Guide Sequences.

FIG. 16 illustrates the server processing of a request for an Assistance Topic made from a client computer. As shown in step 2605, the user interacts with any of a number of search tools, and generates a request Rn for an Assistance Topic in step 2610. Once generated, using infrastructure mechanisms for remote transmission e.g. WinSocket or Hypertext Transfer Protocol (HTTP) in a browser, etc., Rn is transmitted to the CHA Host Application (HA) Server in step 2615. On the HA Server Rn is received and processed into form RnQ in step 2620, which unpacks the request and prepares the received input and its parameter set for processing. The RnQ is passed on to the Main Host App Server Components in step 2625, and parsing and processing begins in step 2630 with a test to determine if the request Rn has been previously processed via indexed searching and whether the request Rn is currently in the HA Server's storage. If the request Rn is currently stored, then Rn is transformed into an output Sn for transmission in step 2655, and a retrieval takes place for the pre-packed delivery components which include all needed code and data for the Guide Sequence. If the request Rn is not currently stored, then step 2635 is performed in which RnQ is evaluated and passed to the Host App Model Processor 2040, shown in FIG. 12, in which RnQ is then entered into the different Host App Model function set for execution Guide Sequence generation in step 2640. The output Sn is then formed in step 2645 either from a dynamically generated Guide Sequence which has been created, and then assembled, or retrieved from the Application CHA Database.

The output Sn includes Host App Model functions and supporting InfoObjs and Commentary Objects as well as opcode operators to facilitate the synchronization of user actions and the processing of objects in the expression engine. In step 2650, the output Sn is compressed, packed, and prepared for transmission. The output Sn is then passed to the server transmitting module in step 2655, and the output Sn is conveyed through the network connection to arrive intact on the client machine in step 2660. Upon receipt, the output Sn is expanded and unpacked at in step 2665, and passed to the client computer's local CHA Run-Time components in step 2670, where the Guide Sequence is executed in step 2675, as described herein for both fixed and dynamic Guide Sequence processing.

Using the CHA system and method in conjunction with live host applications, the CHA System and method has the ability to quickly generate dynamic paths and to synchronize associated InfoObjs accurately, as well as having the ability to generate Commentary and Connective language elements between and leading to user actions. Every path generated and executed can have a unique combination of elements.

What is claimed is:

1. A method of monitoring data events occurring in a computer host application while the host application is executing on a computer, the method comprising the steps of:

storing in a database a host application model containing logical GUI objects, system GUI object properties, and a GuiFramework that models the host application interface controls so as to reflect the different states of the host application;

extracting the GuiFramework from the database and storing the GuiFramework in a memory structure;

expanding the GuiFramework into an interlinked, indexed network structure in the memory structure;

initializing data structures including a session structure;

intercepting, during execution of the host application, one or more operating system messages to obtain a plurality of information relating to a plurality of data events, wherein the messages are present on a low level of an application interface structure;

organizing the intercepted data events in the session structure;

analyzing the data events to make automated inference of a user's interaction with the host application;

capturing user input to create action structures from runtime dynamic system GUI objects to obtain user patterns;

mapping the action structures with the logical GUI objects to determine correspondence for execution of SeqExecBuffer opcodes by interactive custom accelerated procedure processing (ICAP) and execution; and generating potential ICAP procedures utilizing the GUIFramework, the system GUI object properties, and the user patterns.

2. The method of claim 1, further including the step of caching portions of the GuiFramework.

3. The method of claim 1, wherein the data events include data events pertaining to session control information.

4. The method of claim 1, further comprising the steps of:
monitoring all user actions with the host application;
creating a session monitor data set over a time period interval, wherein the session monitor data set is created by accumulating the monitored user actions into a monitoring database;
compiling the accumulated session monitor data set; and
analyzing the accumulated session monitor data set.

5. The method of claim 4, wherein the time period interval is settable by the user.

6. The method of claim 4, wherein the compiling step and the analyzing step occur at one of a scheduled time and by an invocation of the user.

7. The method of claim 1, wherein the analyzing step further comprises the step of evaluating user inputs in real-time.

8. The method of claim 1, further comprising the steps of:
separating actions involving tool bars and controls executing a single action function;
removing these actions from the session structure.

9. The method of claim 1, wherein the GuiFramework models navigational states of the host application.

10. A method of monitoring host application events while the host application is executing on a computer to locate frequent user sequences, comprising the steps of:

storing in a database a host application model containing logical GUI objects, system GUI object properties, and a GuiFramework that models the host application interface controls;

capturing user input to create action structures from runtime dynamic system GUI objects to obtain user patterns;

mapping the action structures with the logical GUI objects to determine correspondence for execution of SeqExecBuffer opcodes by interactive custom accelerated procedure processing (ICAP) and execution;

generating potential ICAP procedures utilizing the GUIFramework, the system GUI object properties, and the user patterns;

locating action events having the highest interface level position;

inspecting action structures for continuous property values representing ordinal positions with the host application;

identifying start and end points for the continuous action structures; and generating reports and statistics relating to the user patterns, the potential ICAP procedures, a frequency of use and manner of use of interface objects accessed by the continuous action structures.

* * * * *